US008533296B2

(12) United States Patent
McGowan

(10) Patent No.: US 8,533,296 B2
(45) Date of Patent: Sep. 10, 2013

(54) SCHEMA-BASED FEED GENERATION FOR MEDIA SYNDICATION

(75) Inventor: Albert John McGowan, Phoenix, AZ (US)

(73) Assignee: Unicorn Media, Inc., Tempe, AZ (US)

( * ) Notice: Subject to any disclaimer, the term of this patent is extended or adjusted under 35 U.S.C. 154(b) by 305 days.

(21) Appl. No.: 12/888,105

(22) Filed: Sep. 22, 2010

(65) Prior Publication Data

US 2012/0072542 A1   Mar. 22, 2012

(51) Int. Cl.
*G06F 15/16*   (2006.01)
(52) U.S. Cl.
USPC ........... 709/219; 709/203; 709/217; 709/226; 707/708; 707/803
(58) Field of Classification Search
USPC .............. 709/203, 217, 219, 226; 707/1, 707/3, 708, 803
See application file for complete search history.

(56) References Cited

U.S. PATENT DOCUMENTS

| | | | |
|---|---|---|---|
| 2007/0156809 A1* | 7/2007 | Dickinson et al. | 709/203 |
| 2011/0087638 A1* | 4/2011 | McKevitt et al. | 707/687 |
| 2012/0072465 A1 | 3/2012 | McGowan et al. | |
| 2012/0072541 A1 | 3/2012 | Carls et al. | |

OTHER PUBLICATIONS

Australian Patent Application No. 2010202782, entitled "Cloud Data Persistence Engine," filed in the name of Unicorn Media, Inc. on Jul. 1, 2010, 53 pages.

* cited by examiner

*Primary Examiner* — Wing F Chan
*Assistant Examiner* — Hitesh Patel
(74) *Attorney, Agent, or Firm* — Kilpatrick Townsend & Stockton LLP

(57) ABSTRACT

Systems, methods, and machine-readable media are described for providing output feeds having information associated with at least one file. Embodiments include generating an output feed schema used to determine the content of the output feed using information from at least one data object, where each data object comprises a data structure having information, including a universal resource indicator (URI) regarding the at least one file. The output feed schema and the at least one data object can then be used to generate the output feed, which can then be stored.

22 Claims, 16 Drawing Sheets

SCHEMA-BASED FEED GENERATION FOR MEDIA SYNDICATION

BACKGROUND OF THE INVENTION

This disclosure relates in general to cloud-based computer processing and, but not by way of limitation, the communication and storage of data within cloud-based computing systems and across inter-cloud application boundaries.

Increased networking bandwidth and processing power of networked computers in recent years has increased the popularity for cloud-based computing. Cloud based computing, or Internet/network-based computing in which resources, software, and information are shared among computing systems and other networked devices, has enabled the creation and enhancement of large-scale services. Such services can include content delivery networks (CDNs), file management services, and more.

Cloud-based services can often require the integration of multiple applications, which can be executed by multiple computing systems. These applications can have application programming interfaces (APIs) that can provide data objects to other applications, both within a cloud and external to the cloud. However, these objects typically conform to a static format. Thus, a data object received by a first application requires from a second computing system, will rarely be of a format readily usable by the first application. Instead, the first application will have be altered to accept data objects of the type provided by the second application. Thus, the integration of applications, and the computing systems on which they are executed, can be time consuming—especially where many applications and/or computing systems are involved.

BRIEF SUMMARY OF THE INVENTION

Systems, methods, and machine-readable media are described for providing output feeds having information associated with at least one file. Embodiments include generating an output feed schema used to determine the content of the output feed using information from at least one data object, where each data object comprises a data structure having information, including a universal resource indicator (URI) regarding the at least one file. The output feed schema and the at least one data object can then be used to generate the output feed, which can then be stored.

According to one embodiment, a server is provided that uses data objects to generate output feeds having information associated with files. The server can be configured to generate an output feed schema used to determine the content of an output feed using information from one or more data objects. The server further can be configured to store the output feed schema and receive, with a network interface, at least one data object. Each data object can comprise a data structure having information including a universal resource indicator (URI) of a file. The server also can be configured to use the output feed schema and the at least one data object to generate the output feed, where the at least one data object can comprise a first plurality of properties. The output feed can comprise a second plurality of properties where each property of the second plurality of properties of the output feed corresponds to a property of the first plurality of properties of the data object. Furthermore, the properties of the first and second pluralities of properties can include a name and a value, the value being associated with at least one file. The output feed can include a URI of the at least one file. Finally, the server can be configured to store the output feed.

Variations of the embodiment are also contemplated. Explicit variations include the server being further configured to send, with the network interface, a URI of the output feed. Additionally or alternatively, the server can be configured to receive input with a user interface. Such input can include selection of properties comprising the second plurality of properties of the output feed. Variations can include embodiments where a property of the second plurality of properties has a different name than the property of the first plurality of properties to which it corresponds. The server can further be configured to determine the at least one data object has changed and update the output feed to reflect a change in the at least one data object.

According to another embodiment, a method is provided for providing output feeds having information associated with at least one file. The method can include generating an output feed schema used to determine the content of an output feed using information from at least one data object. Each data object can comprise a data structure having information regarding a file and a URI of the file. The method also can comprise storing the output feed schema and using the output feed schema and the at least one data object to generate the output feed. The at least one data object can comprise a first plurality of properties, and the output feed can comprise a second plurality of properties. Each property of the second plurality of properties of the output feed can correspond to a property of the first plurality of properties of the data object, and the properties of the first and second pluralities of properties can include a name and a value, the value being associated with at least one file. The output feed can include a URI of the at least one file. The method can further provide for storing the output feed and providing a URI of the output feed.

The embodiment can include numerous alterations. For instance, the method can include receiving input with a user interface. The user interface can be configured to receive a selection of properties comprising the second plurality of properties of the output feed. Additionally or alternatively, the user interface can be configured to receive information for corresponding a property of the second plurality of properties to a property of the first plurality of properties. Moreover, if at least one file comprises at least one media asset, the user interface can be configured to receive one or more properties for transcoding the at least one media asset. Such properties can include information regarding an audio bitrate, a video bitrate, or an aspect ratio. The one or more properties can be used to transcode the at least one media asset.

Further variations of the embodiment are contemplated. For instance, a property of the second plurality of properties can have a different name than the property of the first plurality of properties to which it corresponds. Additionally or alternatively, the output feed comprises one or more of extensible markup language (XML), really simple syndication (RSS), media RSS (MRSS), and Atom Syndication Format. The method can further comprise determining the at least one data object has changed and updating the output feed to reflect a change in the at least one data object.

An additional embodiment involves one or more machine-readable media. The one or more machine-readable media can have a set of instructions stored thereon for providing information regarding media assets using output feeds. These instructions, when executed by one or more machines, can cause the one or more machines to generate and store an output feed schema used to determine the content of an output feed using information regarding one or more media assets. Information regarding at least one media asset can be received, including a URI of the at least one media asset. The output feed schema and the information regarding at least one media asset can be used to generate the output feed. The information regarding at least one media asset can comprise a first plurality of properties and the output feed can comprise a second plurality of properties. Each property of the second plurality of properties of the output feed corresponds to a property of the first plurality of properties of the information regarding at least one media asset. The properties of the first and second pluralities of properties can include a name and a value, and the value can be associated with the at least one media asset. The output feed can include a URI of the at least one media asset, and the instructions of one or more machine-readable media can cause the one or more machines to store the output feed.

Again, various alterations are contemplated. Explicit variations include receiving input with a user interface. The user interface can be configured to receive information for corresponding a property of the second plurality of properties to a property of the first plurality of properties. Additionally or alternatively, the user interface can be further configured to receive input regarding one or more properties of the at least one media asset. Such input can include a video bitrate, an audio bitrate, and/or an aspect ratio. The instructions further can cause the one or more machines to transcode the at least one media asset using the input.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Systems, methods and machine-readable media can be utilized to facilitate the integration of systems executing applications providing cloud-based and/or web services. More specifically, data objects and schemas may be used by systems, such as file management systems, to facilitate the management and distribution of files between various systems. Data objects can comprise information, such as metadata, regarding any file type. And the file itself can be stored internal or external to a system storing the corresponding data objects. Thus, such a file management system can be utilized by a variety of cloud-based services.

Figure 1:
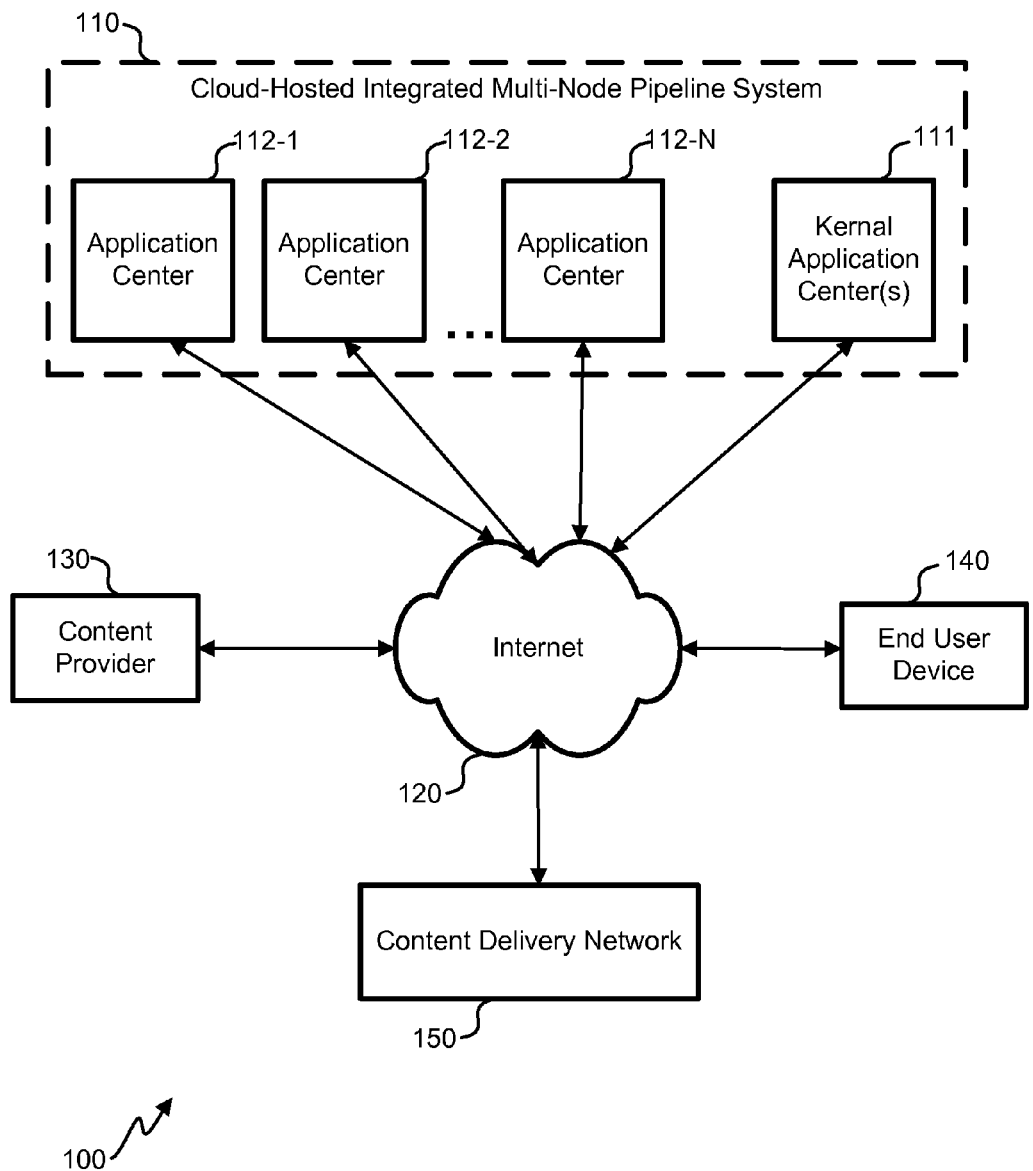
FIG. 1 is a block diagram illustrating an embodiment of a media servicing system 100.

While the above embodiments may be implemented in a variety of different systems, some particular embodiments may be implemented as part of a media service system. FIG. 1 is a block diagram illustrating a media servicing system 100, according to some embodiments of the present invention. The system may deliver media content to the end user device 140 through a network such as the Internet 120. The end user device 140 can be one of any number of devices configured to receive media over the Internet 120, such as a mobile phone, tablet computer, personal computer, portable media device, etc. A media asset provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media asset. Although a media asset can comprise any type of media file (e.g., video, audio, Flash, etc.), it will be understood, as explained above, that embodiments can be applied to files of any type, including file types having no media content.

The media servicing system further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide a user of the end user device 140 with a more desirable playback experience.

End user device 140 can request a media asset to stream with a client application executed by the end user device 140. The client application can be, for example, a media player, browser, or other application adapted to request and/or play media assets. In response to a request for a media asset, the CHIMPS 110 can utilize any number of application centers 112 and/or kernel application center(s) 111 to provide the client application with a data object concerning the requested media asset. The data object can include information about the media asset, including where the media asset can be located, such as within the CDN 150 or within the CHIMPS 110 itself. Location information may be provided by Universal Resource Indicator (URI), such as a Universal Resource Locator (URL) or other indicator. During playback of the media asset, the CHIMPS 110 can collect data regarding the playback through beaconing provided by a client application executed by the end user device 140 and/or indexing service from within the CHIMPS and/or CDN. The CHIMPS 110 can subsequently provide the data and/or any analytics information derived from the data to the content provider 130.

Figure 2A:
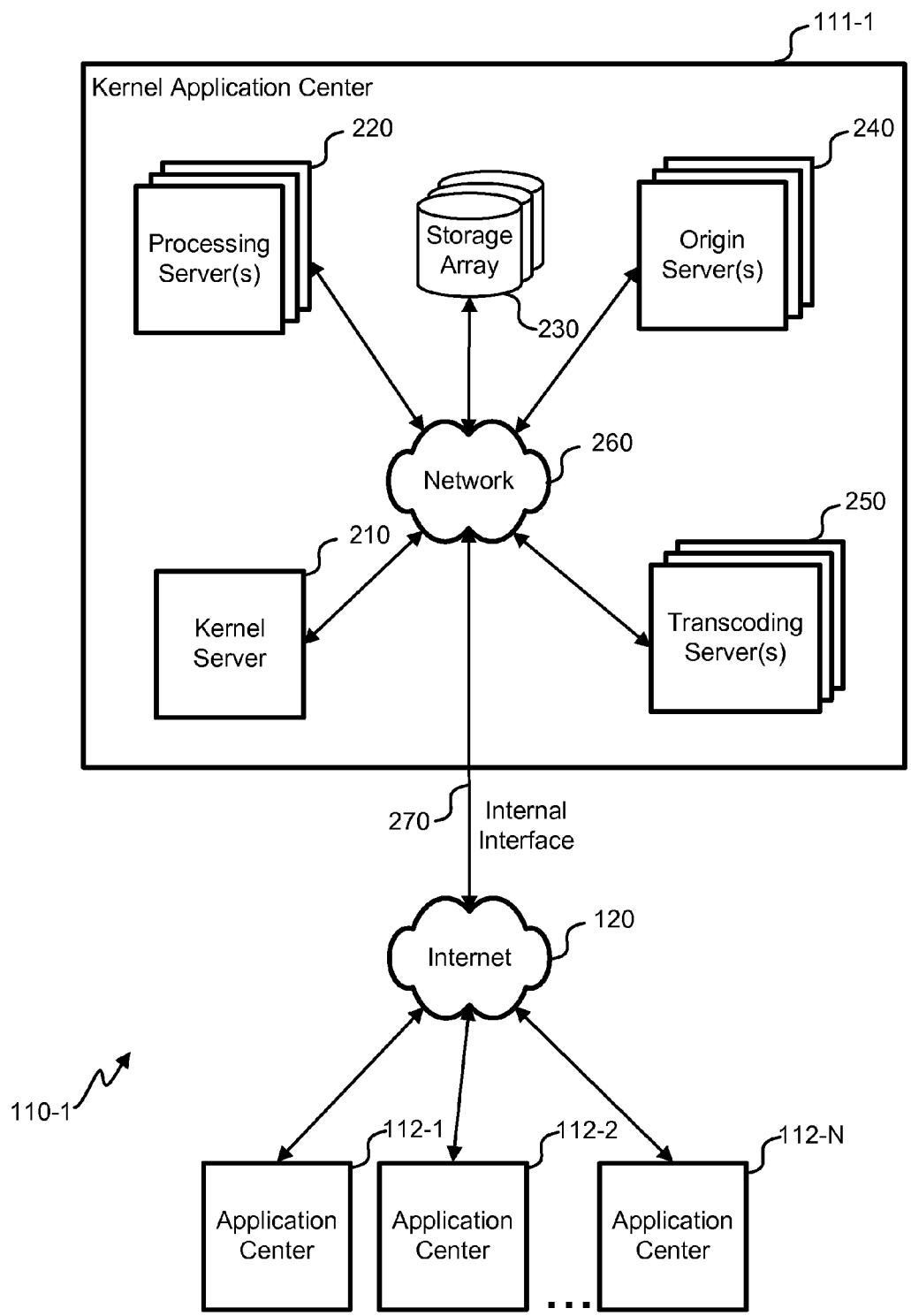
FIG. 2A is a block diagram illustrating an embodiment of a kernel application center connected with application centers from within the cloud-hosted integrated multi-node pipelining system (CHIMPS).

FIG. 2A is a block diagram illustrating an embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user device 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server can then notify services running on the processing server(s) 220 of the upload. These services can utilize transcoding server(s) to transcode the media asset, which can then be moved to a CDN 150 and/or stored locally by storage array 230 and origin server(s) 240. Services running on the processing server(s) 220 can also update the associated data object stored by the storage array 230 and origin server(s) 240.

Figure 2B:
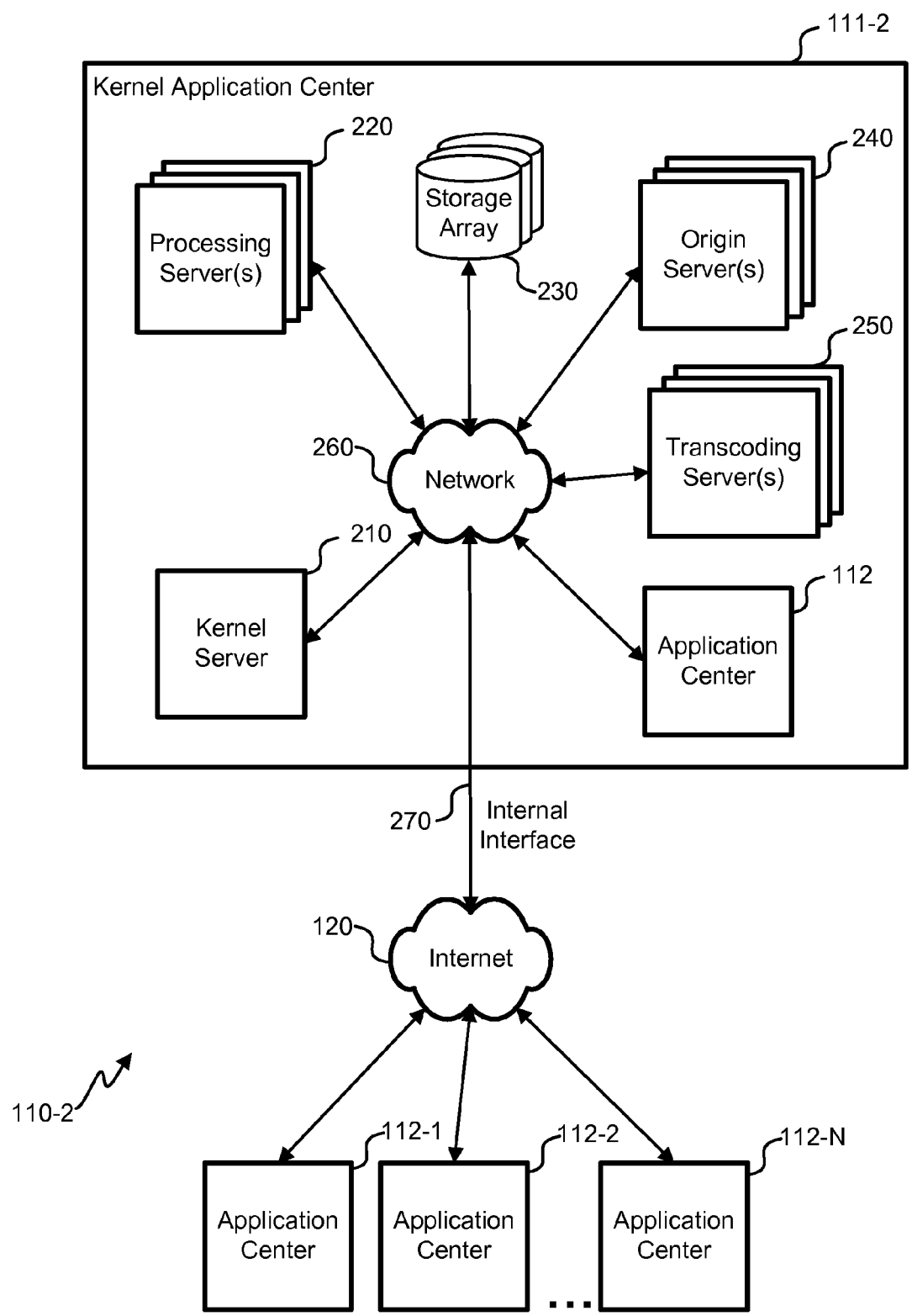
FIG. 2B is a block diagram illustrating an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers 111 with one or more application centers incorporated therein. Additionally or alternatively, components of the kernel application center 111-2 may be incorporated into one or more application centers 112 in the CHIMPS 110 to provide quicker access to certain functionality.

Figure 3:
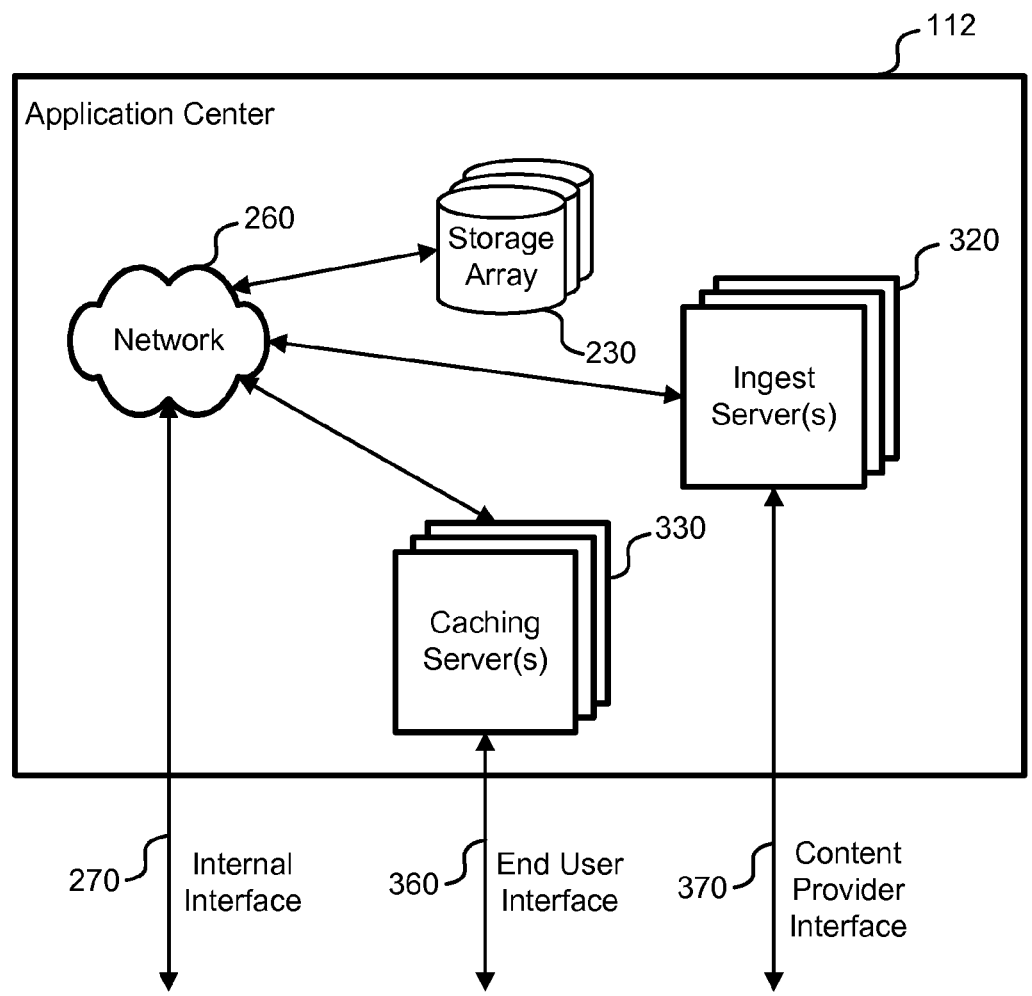
FIG. 3 is a block diagram illustrating an embodiment of an application center.

FIG. 3 is a block diagram illustrating an embodiment of an application center 112. The application center 112 can include caching server(s) 330 and a storage array 230 for storing and distributing data objects of media assets requested by end user devices through end user interface 360. Caching server(s) 330 and storage array 230 can also be used to collect, process, and/or store metrics information from beaconing data, media chunk requests, and/or other data sources, including data collected through end user interface 360. The application center can further include ingest server(s) 320 for ingesting uploaded media assets from a content provider 130 through a content provider interface 370. The media assets may be stored on the storage array 230. As with the kernel application center 111, the components of the application center 112 can be communicatively linked through a network 260, such as a LAN. The application center can further include an internal interface 270, providing a communication link from the application center to the rest of the CHIMPS. It is through internal interface 270, for example, that media assets stored on storage array 230 can be made available to a kernel application center 111 for services such as transcoding.

Figure 4:
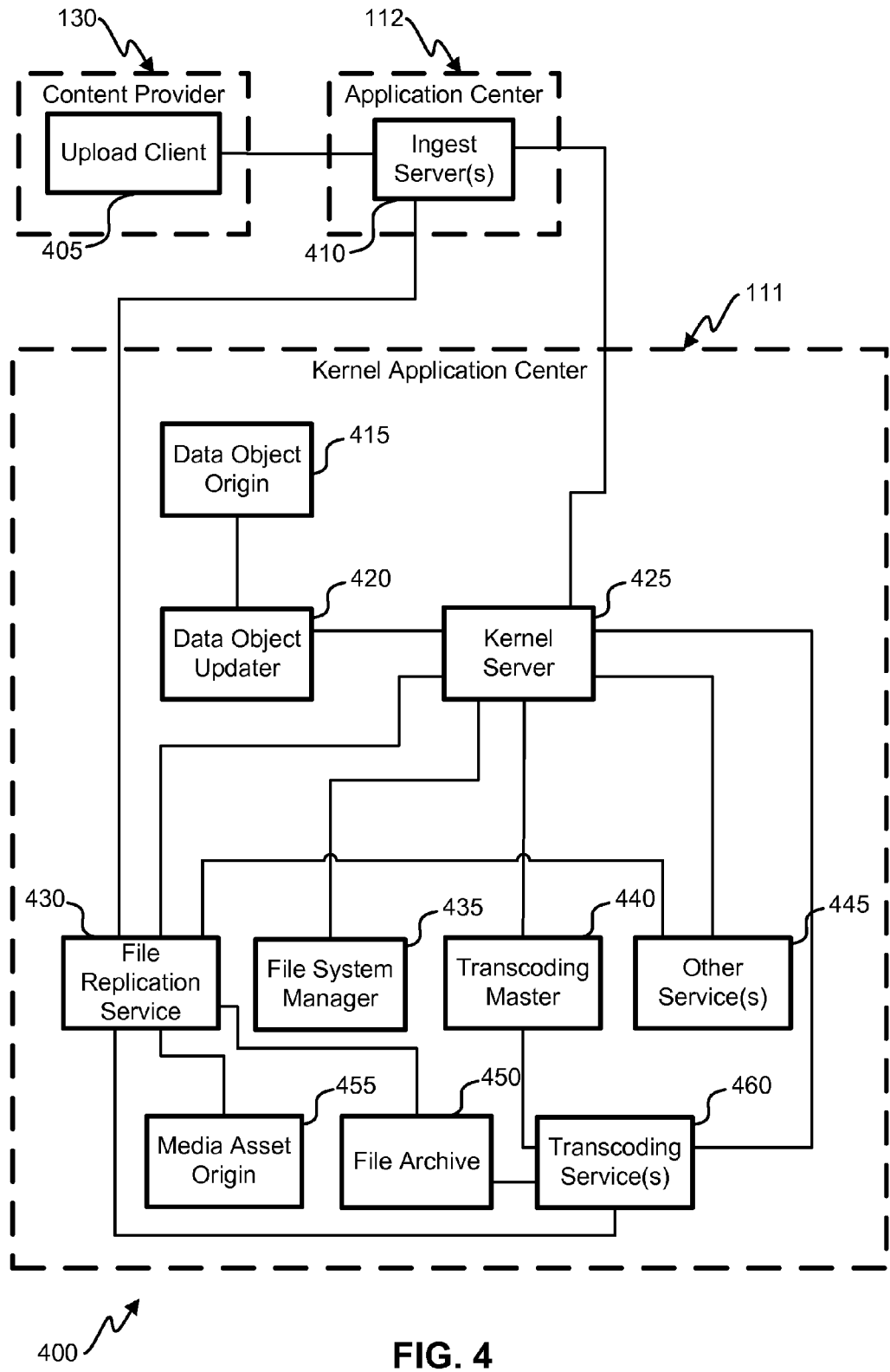
FIG. 4 is a block diagram of an embodiment of processes and objects utilized by the CHIMPS for media ingestion.

FIG. 4 is a block diagram 400 of processes and objects utilized by the CHIMPS 110 for media ingestion, according to some embodiments. Although FIG. 4 further indicates the physical systems in which my execute or store these processes and objects, it will be understood that the processes and objects disclosed may be executed or stored on more than one system, including systems not disclosed in FIG. 4. In other words, the processes and objects shown in FIG. 4 allow for a variety of implementations through one or more of hardware, software, firmware, microcode, etc.

Media can be ingested into the CHIMPS 110 when a content provider 130 uploads a media asset to ingestion server(s) 410 in an application center 112 by utilizing a client 405. The client 405 can be a stand-alone application or browser based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured organize the workflow among services such as transcoding 440 file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media assets between services. For example, retrieving the uploaded media asset from the ingest server(s) 410 and storing it on the file archive 450, or retrieving transcoded media assets from transcoding server(s) 460 and storing them in the media asset origin.

The data object updater 420 keeps the data object origin 415 up to date in response to any changes in the system. When, for example, a file is uploaded, transcoded, and stored in media asset origin 455, the location and other metadata concerning the transcoded media assets need to be created or updated in the data object origin 415 to ensure an end user device that accesses the object in the data object origin 415 has the correct information regarding the related media asset. Because the data object updater 420 receives updates from the kernel server 425 (which is notified when a transcoded media asset is stored in the media asset origin 455, the system ensures the data objects in the data object origin are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 425 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420 which updates the data object origin 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased. For example, a server of the CHIMPS 110 can be configured to dynamically switch its purpose based on external conditions such as load and overall system performance, providing functions such as transcode, upload, metrics collection, application web service, and more, on an as-needed basis.

Figure 5A:
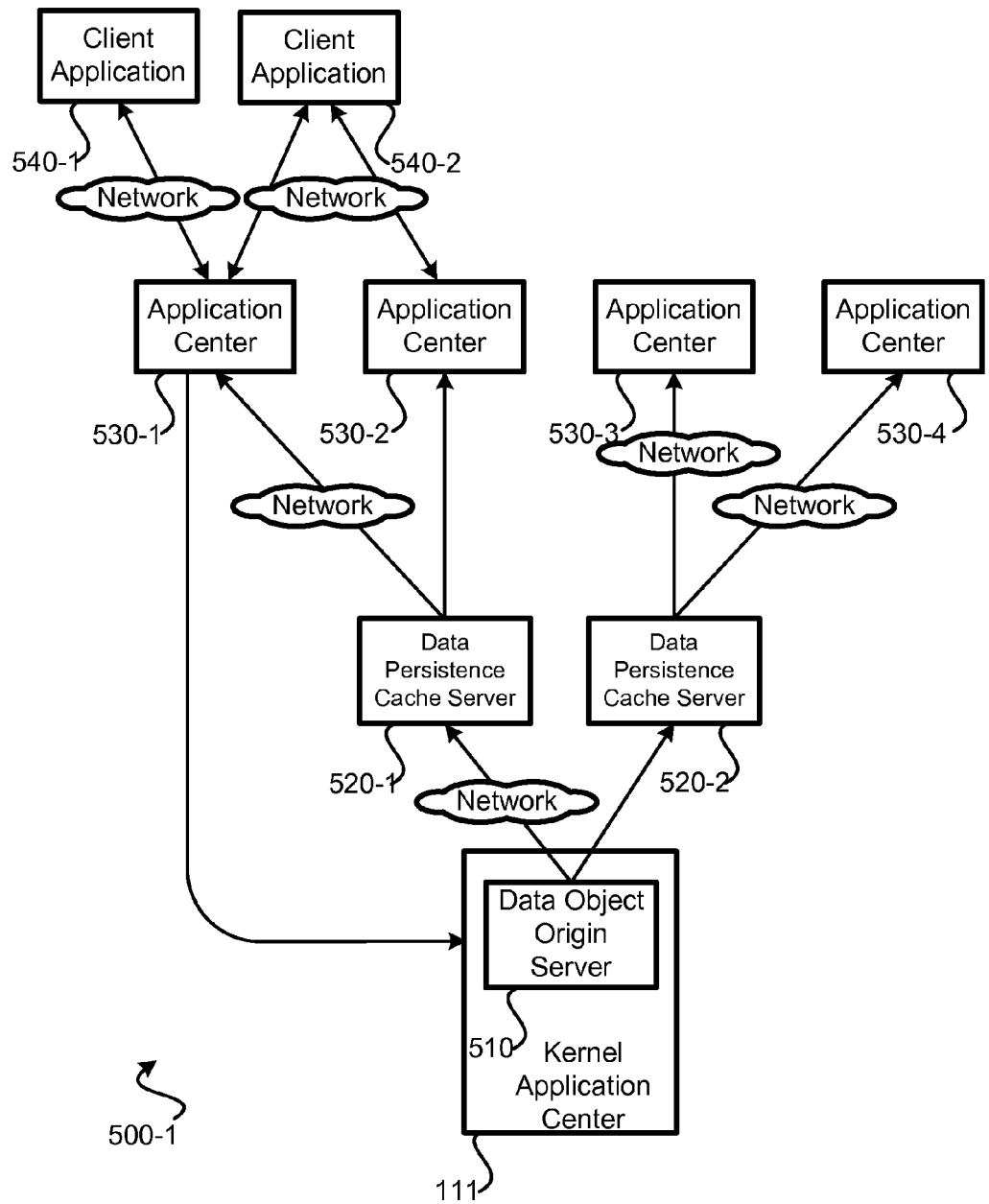
FIG. 5A is a simplified block diagram of an embodiment of a cloud data persistence system.

Embodiments of such systems may include other systems that manage various requests from end users. One such system may be a cloud data persistence system. Such a system is described in detail in Australian patent application no. 2010202782 entitled "Cloud Data Persistence Engine," which is incorporated herein by reference, in its entirety. Referring to FIG. 5A, a simplified block diagram of an embodiment of a cloud data persistence system 500-1 is illustrated. Such a system may allow for information, such as data objects, to be efficiently distributed to multiple of clients. Similar to the systems discussed above, although the ensuing description will concentrate on data objects linked to media assets, the systems and methods described herein also can utilize data objects corresponding to files of any type. Thus, the systems and methods described herein can be applied to cloud-based applications beyond media, such as social networking or gaming.

Some embodiments of cloud data persistence systems are used to distribute data objects that are linked to media assets (and/or other file types). A data object may contain information pertinent to the media asset it is linked to. For example, a data object may include details about a media asset and permissions for the media asset. More specifically, a data object may include fields containing: a title, keywords linked to the data object, the data object's (and/or associated media asset's) date of creation, the duration of the associated media asset, the file formats the associated media asset is available in, and what clients are permitted to access and/or edit the data object and/or the media asset. The data object may also contain a link to its associated media asset. Such a link may be in the form of a universal resource indicator, such as a universal resource locator. Other information may also be stored as a data object that is linked to a media asset. A media asset may represent many different forms of media, such as an audio file (in a variety of different formats), a video file, or a flash file, to name only a few examples.

Important to note, data objects may be stored separate from media assets. For example, a data object containing information linked to a particular media asset may not be stored in the same location as the media asset. For example, a media asset may reside on multiple servers that are part of a content delivery network, while the data object that contains information about the media asset is stored in some other location, possibly on some other network. Also, while the above discusses linked media assets, it should be understood that data objects may also be linked to other assets, files or data that do not constitute media. In such embodiments, the data objects may contain different fields of data.

Such a cloud data persistence system may be used to distribute data objects to one or several clients, but also may be used to distribute data objects to thousands of clients geographically disbursed worldwide. In the embodiment of cloud data persistence system 500-1, three levels of servers are present: a data object origin server 510, data persistence cache servers 520, and application centers 530. These application centers are in contact with one or more clients 540. It should be understood that each application center may include one or more servers. For example, an application center may be represented by application center 112 of FIG. 3. Alternatively, an application center may comprise a single server. While three levels of servers are present in the illustrated embodiment, it should be understood that greater or fewer levels of servers may be present in other embodiments. Also, various servers may be integrated into the same server. For example, one server may serve as both an application center 530 and a data persistence cache server 520. It should also be understood that the terms of "application center," "data persistence cache server," and "data object origin server" are used to simplify the nomenclature used to describe the various levels of the cloud data persistence system 500-1, and these terms should not be interpreted as limiting the functionality of their respective identified servers.

Referring to cloud data persistence system 500-1, clients 540 make requests for data objects from application centers 530 via one or more networks. In the illustrated embodiment, only two clients (540-1 and 540-2) are present to maintain simplicity; many more clients (possibly representing many end users) may be possible. These clients may communicate with the same application center (530-1) or may communicate with different application centers (530-1 and 530-2). Further, because a client at one time interacts with a particular application center, at a different time, the same client may interact with a different application center. For example, if a particular application center is experiencing a heavy client load, possibly caused by a large number of clients attempting to access it, a client may be routed to another application center.

The client may make a request for a particular data object to the application center. This request may be made via a network, such as the Internet. Other networks may also be possible, such as a private intranet. The request for the data object may involve the client sending a universal resource indicator (URI) to an application center. A URI may take a variety of different formats. In particular, the URI may be in the form of a universal resource locator (URL). However, it should be understood that other forms of URIs may also be possible.

If client 540-1 transmits a URI to application center 530-1, application center 530-1 may have the data object linked to the URI stored locally. If this is the case, application center 530-1 may respond by sending the data object identified by the URI back to client 540-1. However, application center 530-1 may have only a subset of the data objects linked to valid URIs stored locally. This may be due to space constraints at application center 530-1. For example, if clients infrequently request particular data objects, it may be inefficient to distribute those data objects to each of application centers 530.

If the data object requested by client 540-1 is not present at application center 530-1, application center 530-1 may contact another server to retrieve it. Application center 530-1 may be located in close proximity to data persistence cache server 520-1, or may be geographically separated from data persistence cache server 520-1. Application center 530-1 may communicate with data persistence cache server 520-1 directly (such as a direct cable connection) or may communicate using a network. This network may be a private network, such as a local area network or dedicated connection between the servers, or may use a public network, such as the Internet. Such a request from application center 530-1 to data persistence cache server 520-1 may include the URI received by application center 530-1 from client 540-1. In some embodiments, data persistence cache servers supply multiple application centers with requested data objects. In cloud data persistence system 500-1, data persistence cache server 520-1 serves two application centers (530-1 and 530-2), while data persistence cache server 520-2 serves two different application centers (530-3 and 530-4). It should be understood that a data persistence cache may serve a varying number of application centers. For example, a data persistence cache may serve 20 application centers.

It should also be recognized that the connections between application centers 530 and data persistence cache servers 520 are dynamic. If a particular data persistence cache is offline, busy, or otherwise unavailable, an application center may be able to route requests to a different data persistence cache server. For example, referring to cloud data persistence system 500-1, if data persistence cache 520 became unavailable, application center 530-1 may be able to route a request for the data object to data persistence cache server 520-2.

While, if application centers 530 and data persistence caches 520 communicate via a network (e.g., the Internet), the servers may be located anywhere a network connection is available worldwide. In some embodiments, a data persistence cache is located near a group of application centers. For example, if a region, such as New England, contains two application centers for each state, a single data persistence cache may be located in or near New England to serve these twelve scattered application centers. Having the data persistence cache located near a group of application centers may decrease communication latency when an application center and the data persistence cache communicate.

Upon receiving a request for a data object from application center 530-1, data persistence cache server 520-1 may determine if it has the data object stored. If it does, data persistence cache server 520-1 may send the data object to application center 530-1, which may, in turn, send the data object to client 540-1. Upon the application center receiving the data object, it may store the data object to be able to satisfy requests from the same or a different client for the same data object at a future time. Application center 530-1 may make a determination as to whether the data object should be stored or not. For example, the determination may be based on the frequency it is receiving requests for the data object from clients 540. If the data object is frequently being requested by clients 540, application center 530-1 may store the data object. This may only occur if the data object is being requested more frequently than some other data objects. For example, only the 10,000 most frequently requested data objects may be stored by the application center. In some embodiments, application center 530-1 may store the most recently requested data objects. Therefore, this data object would be stored at application center 530-1, and possibly some other data object would no longer be stored at application center 530-1. In some embodiments, different application centers use different mechanisms to determine what data objects to store. Also, in some embodiments, some data objects are always stored at application centers 530. This may occur if a particular data object has been labeled a "high priority" (or some equivalent thereof).

However, if data persistence cache server 520-1 determines that it does not have the data object requested by client 540-1 stored, data persistence cache server 520-1 may contact another server. Data persistence cache server 520-1 may contact another server called a data object origin server 510. Data object origin server 510 may supply data persistence cache servers 520 with various data objects. In cloud data persistence system 500-1, data object origin server 510 is shown as communicating with two data persistence cache servers 520. However, it should be understood that data object origin server 510 may communicate with one, three, or some other number of data persistence cache servers. For example, data object origin server 510 may communicate with more, such as 20 data persistence cache servers.

Data object origin server 510 may be physically located with one or more data persistence cache servers. Data object origin server 510 may communicate directly, such as via a direct connection, with data persistence cache servers. For example, in cloud data persistence system 500-1, data object origin server 510 communicates directly with the data persistence cache server 520-2. Data object origin server 510 may also communicate via any of the previously mentioned networks with a data persistence cache server. Again, referring to cloud data persistence system 500-1, data object origin server 510 communicates with data persistence cache server 520-1 via a network, possibly the Internet.

While application centers 530 and data persistence cache servers 520 may store only a subset of the various data objects that clients 540 may request, data object origin server 510 may store all data objects that exist on system 500-1. In other words, if a data object requested by a client is not present on data object origin server 510, the data object may not exist on system 500-1.

Just as a data persistence cache server may be physically located near a group of application centers, data object origin server 510 may be located near the group of data persistence cache servers 520. Returning to the previous regional example, if a data persistence cache server is located in New England, another may be located near New York City, another near Washington D.C., and perhaps yet another near Chicago. If one data object origin server is servicing these data persistence cache servers, it may be located in a central location to serve them all. In some embodiments, the data object origin server may be co-located with one or more data persistence cache servers. Alternatively, a data object origin server may be located at a separate physical location from any other database servers.

A request from the data persistence cache server 520-1 to data object origin server 510 may comprise a URI. This may be the same URI that was sent from client 540-1 to application center 530-1, then from application center 530-1 to data persistence cache server 520-1. In some embodiments, the URI transmitted from data persistence cache 520-1 may be in a different format than the other URIs. Upon receiving the URI, data object origin server 510 may locate the data object the URI is linked to. The data object origin 510 may then transmit the data object to data persistence cache server 520-1. The data persistence cache server 520-1 may make determination as to whether to store the data objects as previously described in relation to application center 530-1. For example, the determination of whether to store the data object may be based on the frequency with which application centers 530 request the data object from data persistence cache server 520-1. In some embodiments, data persistence cache server 520-1 stores the most recently requested data objects. Data persistence cache server 520-1 may then transmit the data object to application center 530-1. Application center 530-1 may then transmit the data object to client 540-1.

If the data object was first found at application center 530-1, the latency between client 540-1's request and client 540-1 receiving the data object may be the shortest. If instead the data object is first found at data persistence cache server 520-1, the latency may be longer. Finally, if the data object is only found at data object origin 510, the latency may be the longest. Regardless of where the data object is found, client 540-1 may be unaware of whether application center 530-1, a data persistence cache server 520-1, or the data object origin server 510-1, had the data object stored.

While only one data object origin server 510 is present in cloud data persistence system 500-1, more than one data object origin server is possible. For example, a data object origin server may serve a particular region, such as a country. Other data object origin servers may be present in other countries. These data object origin servers may each maintain identical or substantially similar data sets. Therefore, a data object found on one data object origin server would also be found on other data object origin servers. While not illustrated in FIG. 5, it should be understood that data object origin server 510 may be in communication with a kernel server and/or a data object updater server, such as illustrated in FIGS. 2A, 2B, and 4. Such an arrangement may allow multiple different data object origin servers to have the same data objects stored.

While the above deals with the communication flow in cloud data persistence system 500-1 when a client requests a data object, a client (or, of course, an end user acting through the client) may also modify a data object. Depending on the data object, a request for a particular data object may be much more frequent than a request to modify a data object. By way of example only, consider a video clip posted on an online video sharing website. If the video is popular, data object information, such as the video owner's name and the video's title may be sent to millions of different clients. However, the end user who created the video may only infrequently modify (via a client) data linked to the video.

In cloud data persistence system 500-1, the request to modify a data object, as opposed to a request to retrieve a data object, may be treated differently. If client 540-1 makes a request to application center 530-1 to modify a data object, application center 530-1 (assuming the end user and/or client has the proper permissions to modify the data object) may route the request to Kernel application center 111. Kernel application center 111 may then update data object origin server 510, and any other data object origin servers requiring updating. Application center 530-1 may not modify or delete the previous version of the data object if it is stored at application center 530. The data object may then be updated at data object origin server 510. While the data object may now be updated at data object origin server 510, other application centers and data persistence cache servers, such as application center 530-3 and data persistence cache 520-1, may still have out-of-date versions of the data object. Therefore, upon receiving the modifications to the data object, kernel application center 111 may notify data persistence cache servers 520 to no longer use their current version of the data object. This may involve data persistence cache servers 520 deleting their out-of-date version of the data object. In turn, data persistence cache servers 520 may notify application centers 530 to similarly no longer use their out-of-date versions of the data object. This may again involve the out-of-date data object being deleted from application centers 530. Application centers 530 and data persistence cache servers 520 may not receive a new version of the data object along with the notification. Rather, application centers 530 and data persistence cache servers 520 may only receive the new version of the data object if a client requests the data object and it is routed through the data persistence cache server and the application center.

If kernel application center 111 knows what particular data objects are stored at data persistence cache servers 520, a notification may only be sent to the data persistence cache server known to store the data object. Similarly, if data persistence cache servers 520 know what data objects are stored at application centers 530, only those application centers that have out-of-date versions of the data object may be sent the notification. In some embodiments, whenever a modification of a data object is received at kernel application center 111, all data persistence cache servers 520 are notified, which in turn notify all application centers 530. In such embodiments, therefore, kernel application center 111 does not need to be aware of what particular data objects are stored at data persistence cache servers 520, and data persistence cache servers 520 do not need to be aware of what data objects are stored at application centers 530. In some embodiments, Kernel application center 111 notifies both data persistence cache servers 520 and application centers 530.

Figure 5B:
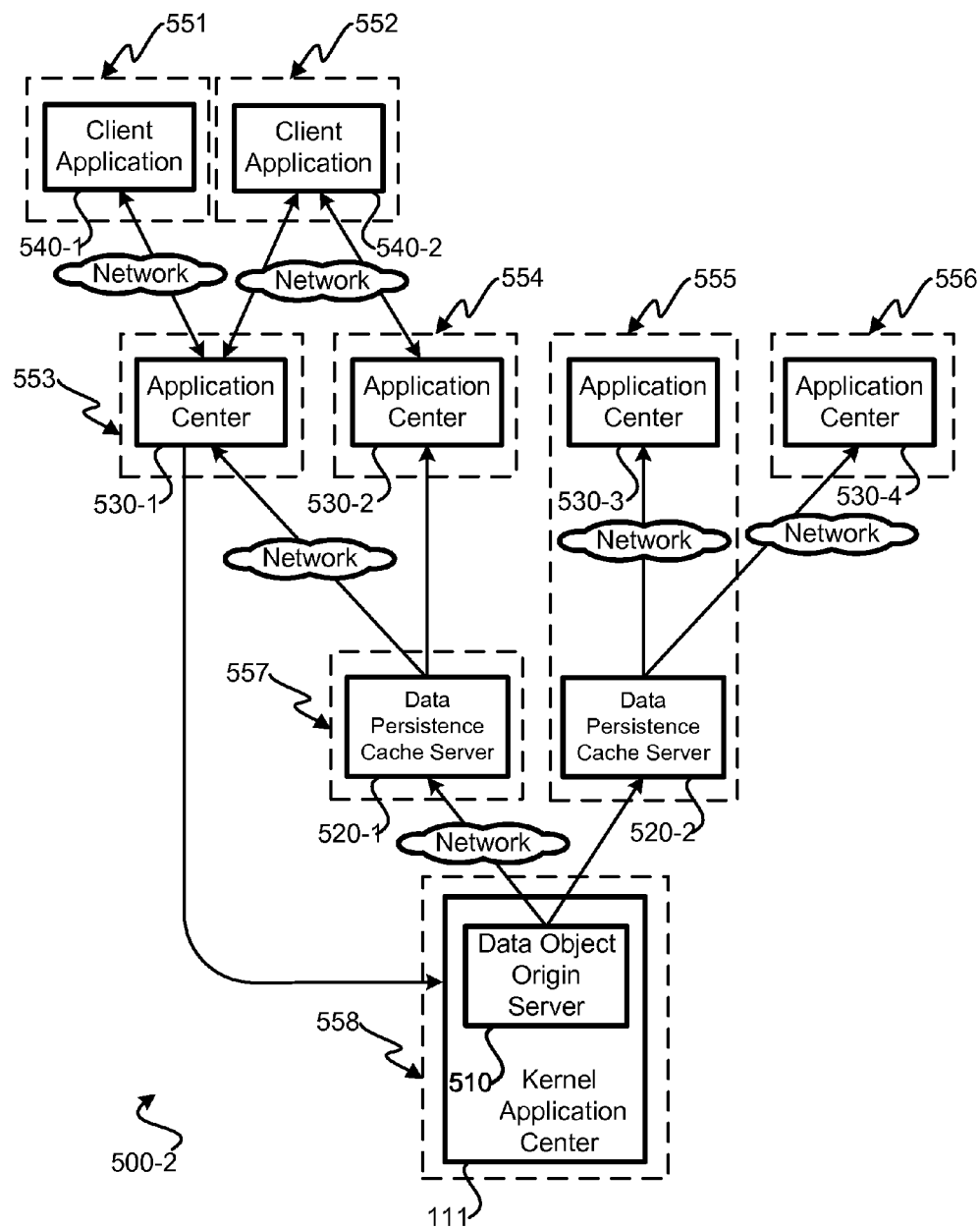
FIG. 5B is a simplified block diagram of another embodiment of a cloud data persistence system.

Referring to FIG. 5B, a simplified block diagram of an embodiment of a cloud data persistence system 500-2 is illustrated. Such a system may be substantially similar to system 500-1. However, system 500-2 illustrates how various components of system 500-2 may be geographically separated. It should be understood that each component of system 500-2 may be located at a different physical location. In some embodiments, client 540-1 is at location 551 while client 540-2 is at location 552. Locations 551 and 552 may be close together, possibly only several miles if both client 540-1 and client 540-2 are using the same application center. Clients 540-1 and 540-2 may be a great distance apart if they are using different application centers.

Application centers 530-1, 530-2, 530-3, and 530-4 are shown as different locations of 553, 554, 555, and 556, respectively. Application centers that use the same data persistence cache server may be closer together than application centers that do not use the same data persistence cache servers. Further, as those with skill in the art will recognize, while an application server may not be physically closer to a data persistence cache server, due to the state of the network, communication between two physically further apart servers may be quicker. In such a case, the further servers may be in communication as opposed to the closer servers.

Data persistence cache server 520-1 is at another location 557. Location 557 may be near or in between location 553 and 554. Data persistence cache server 520-2 is at the same location 555 as application center 530-3. In some embodiments, data persistence cache server 520-2 is at some other location from application center 530-3. Finally, data object origin server 510 may be present at location 558. This location may be at the kernel application center 111, or may be separate.

The use of data objects in the CHIMPS 110 by means such as the cloud data persistence system 500 described above, facilitates the management of media assets (and/or other file types) to which the data objects correspond. Additionally, systems utilizing data objects (hereafter referred to as "internal data objects," or "IDOs") may be configured to generate various permutations of the data objects as requested by an application. These permuted objects, or application data objects (hereafter "ADOs") can be provided with an API to different applications upon request. Traditional systems may provide a static data set or a static object derived from the data set by an API. However, the CHIMPS 110 and similar systems can use the IDOs persisted through the cloud data persistence system 500 as data sources to create ADOs of any desired form, discussed in more detail below. Because the CHIMPS 110 can create ADOs upon request, there is no need to create and store different permutations of IDOs beforehand. That said, some embodiments contemplate creating and storing ADOs, thereby foregoing the need to create a particular ADO if it is requested more than once. By providing ADOs in this fashion, the entity receiving the ADO thereby saves time and processing power it would otherwise take to convert a static data set (or data received in another format) to a more usable form.

Storing information regarding media assets (and/or other file types) as IDOs can facilitate the creation and delivery of application data objects, or data objects derived from the IDOs and provided to through an API to external entities. The IDOs of the CHIMPS 110 can adhere to a base schema, requiring that all IDOs include certain properties. These required properties can be, for example, the properties required by the CHIMPS 110 to properly process and manage data objects, which may vary depending on the desired functionality of the CHIMPS 110. Data objects can include properties such as methods and data fields. Data fields can include, for example and not by way of limitation, a unique identifier, status, title, author, profile, information regarding advertisement breaks, available application schemas (discussed in more detail below), file size, date created, date last modified, and more.

IDOs as stored by the CHIMPS 110 can include many properties in addition to those required by a base schema. Various internal schemas can be created to facilitate the creation and management of IDOs. These internal schemas can derive from the base schema, therefore inheriting the minimal properties required by the base schema. Furthermore, properties of the internal schemas may be specified by entities providing the data from which the IDOs are created, such as content providers 130.

Figure 6:
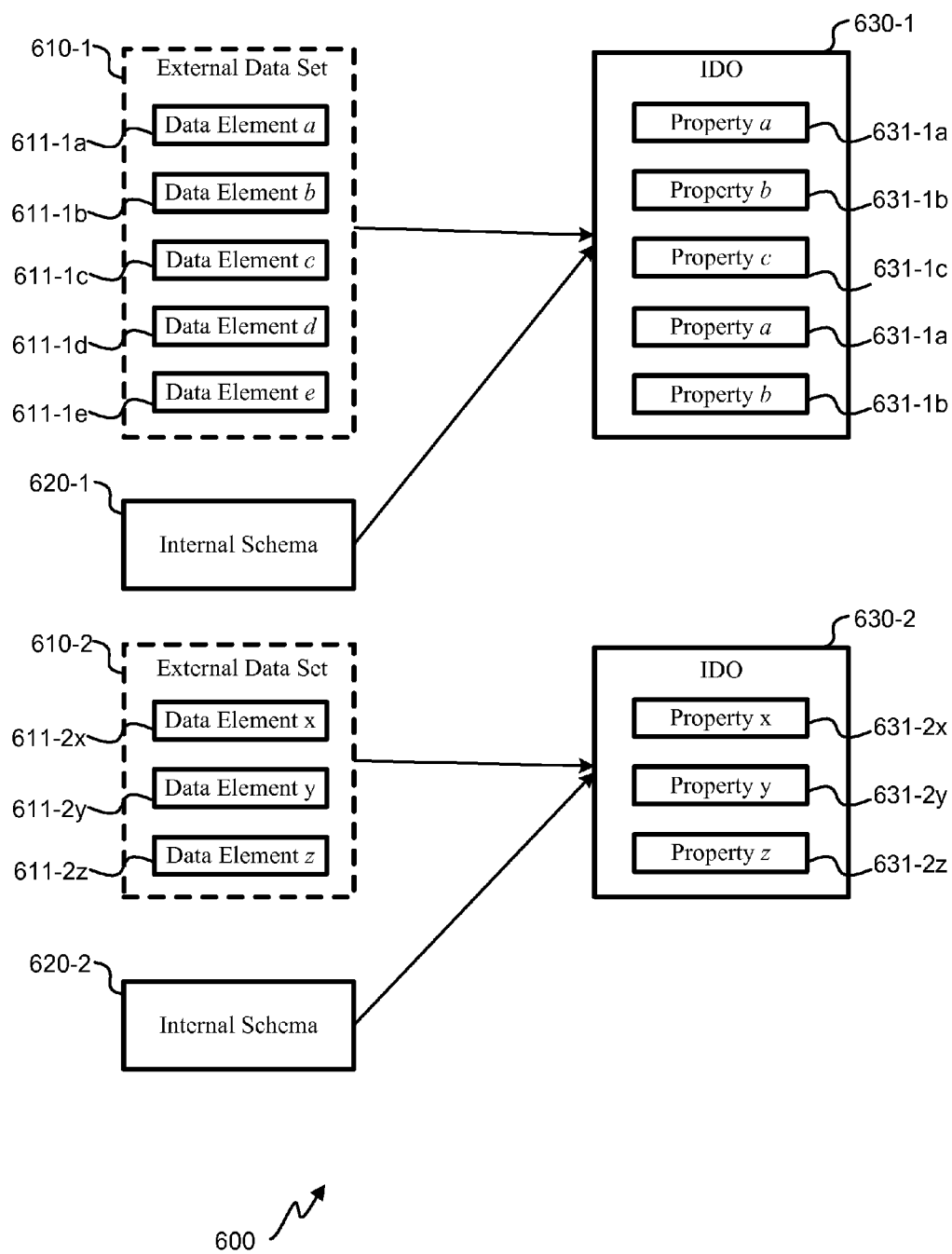
FIG. 6 is a simplified block diagram illustrating an embodiment of how internal schemas may be utilized to create internal data objects from external data.

FIG. 6. is a simplified block diagram illustrating one embodiment 600 of how internal schemas may be utilized to create IDOs from external data. According to this embodiment, external data sets 610 comprising a plurality of data elements 611 can be used to create IDOs 630. Internal schemas 620 may be created to specify properties 631 of IDOs 630 and to map data elements 611 of the external data set 610 to those properties 631.

Using embodiment 600 as an example, a content provider 130 can specify a data format of an external data set 610-2 by which it can provide the CHIMPS 110 data regarding one or more media assets. If the format specified can include three types of data elements 611-2—for example, a Title, Artist, and URI—the CHIMPS 110 can then create an internal schema 620-2 to use for receiving the external data set 610-2 and creating a corresponding IDO 630. The internal schema 620-2 can be reused numerous times to create multiple IDOs from external data sets including the three types of data elements 611-2 specified by the content provider 130.

The names of properties 631 of IDOs 630 may differ from the corresponding data elements 611 of the external data sets 610. Schemas 620 therefore can map data elements 611 of external data sets to one or more properties 631 of an IDO 630. Continuing with the example above, the external data set 610-2 can include a Title, Artist, and URI, but the base schema can require that an internal object 630-2 have a Name, Author, and Unique Identifier. In this case, the content provider 130 can indicate to the CHIMPS that the Title, Artist, and URI for external data set 610-2 (and other data sets for use with internal schema 620-2) maps to a Name, Author, and Unique Identifier, respectively. The internal schema 620-2 can include such mapping data.

The ability to map data elements 611 of external data sets 610 to properties 631 of corresponding IDOs 630 provides for other types of functionality. Internal schemas 620 can provide for mapping data elements 611 to multiple properties 630. For example, a data set 610 may include a URI data element 611, which can be mapped to properties for a URL and Unique Identifier. Moreover, data elements 611 may be reformatted, altered, and/or combined to create properties 630.

Multiple internal schemas 620 may be created, enabling the CHIMPS 110 to store IDOs 630 having different formats. Different external entities, such as different content providers, may customarily store data regarding media assets (and/or other file types) in different formats. Because the CHIMPS 110 can create internal schemas 620 for each entity, the external entity does not need to reformat its external data (such as external data set 610) before integrating with the CHIMPS 110. Additionally, multiple internal schemas 620 may be used by a single external entity, corresponding to multiple file types. For example, a first internal schema 620-1 may be used to create a first IDO 630-1 from a first external data set 610-1 comprising information regarding a media asset of a content provider 130. A second internal schema 620-2 may be used to create a second IDO 630-2 from a second external data set 610-2 comprising information regarding a video game of the same content provider 130.

Internal schemas 620 can be stored as objects themselves. The internal schema objects can be managed and persisted throughout the cloud data persistence system 500 of the CHIMPS 110 in a manner similar to the IDOs 630 as described above. Moreover, IDOs 630 can include information regarding which application schemas (described in further detail below) may be used with the IDO 630 to create a ADO.

According to some embodiments, internal schemas 620 and IDOs 630 can be created without requiring changes in programming code. For example, in a Microsoft® .NET programming environment, if a base schema is created at compile time of the programming code, a corresponding object definition, or assembly, is created and cached in the global assembly cache (GAC). Subsequent assemblies corresponding to internal schemas 620 (which derive from the base schema) may be created and cached in the GAC at runtime once an internal schema 620 is created. Additionally or alternatively, IDOs 630 may be created at runtime by directly reading binaries of the files defining the internal schemas 620. Thus, a system running an application for creating IDOs 630, such as a processing server 220 of an application center 112, can be configured to receive any internal schema 620 and create a corresponding IDO 630 without the need to recompile programming code.

As mentioned above, additional schemas, derived from the base schema, may be generated to create ADOs by using data from IDOs 630. These ADOs may therefore comprise any permutation of the IDO 630 from which they were created. The schemas used to create the ADOs (hereafter "application schemas") may be created at runtime and stored as objects in a similar manner as the internal schemas described above. Furthermore, an IDO 630 may be updated to include the internal schema(s) that may be used with the IDO 630 to create ADOs. As mentioned above, because ADOs can be created at runtime and comprise data from IDOs 630 that are stored in the CHIMPS 110, there is no need to store and/or persist the ADOs throughout the CHIMPS 110. That said, some embodiments contemplate doing so, which can decrease processing demands in the CHIMPS.

ADOs may be utilized internally by the CHIMPS 110 and/or passed to an external entity through an API. Thus, the ADOs can be utilized in a variety of scenarios. For example, where the internal objects 630 include information regarding media assets, application schemas may be created for different client applications 520 corresponding to different user devices. A client application 540 of a mobile device, such as a mobile phone, may require a different ADO than a client application 540 of a personal computer. Moreover, a content provider or other entity may specify application schemas for uploaded media assets, thereby controlling how data regarding the uploaded media assets is distributed.

Figure 7:
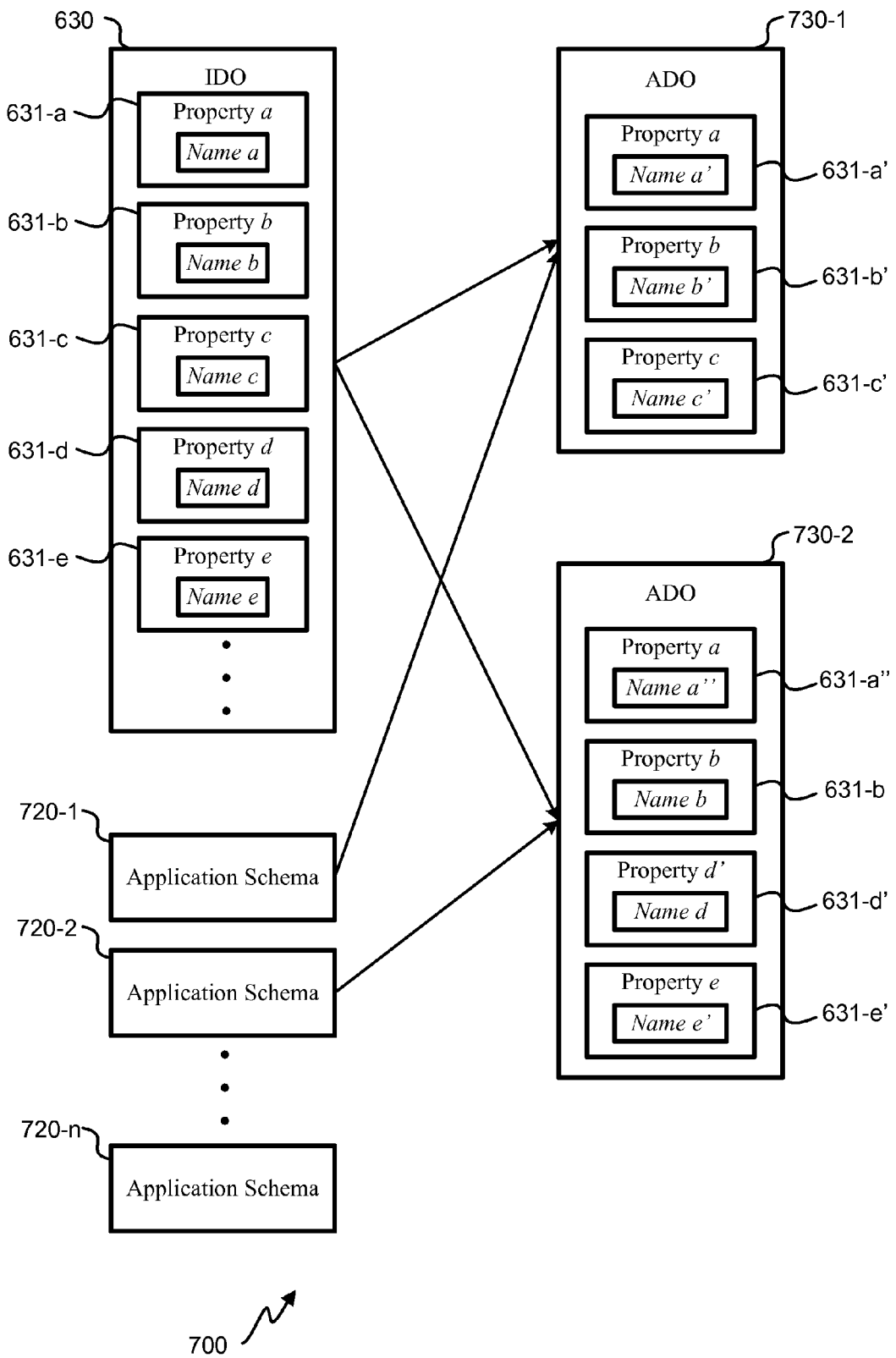
FIG. 7 is a simplified block diagram illustrating an embodiment of how application schemas may be used with an internal data object may be used to create application data objects.

FIG. 7 is a schematic diagram illustrating an embodiment 700 of how application schemas may be used with an IDO may be used to create ADOs. As discussed above, IDO 630 can include any number of properties 631, including properties required by a base schema (not shown), based on the internal schema 620 with which the IDO 630 was created. In a process similar to the process of embodiment 600 showing the creation of IDOs 630, ADOs 730 can be created by from an IDO 630 and one of any number of application schemas 720. Unlike the creation of IDOs 630, which typically involve the creation of only one IDO 630 for each external data set 610, multiple application schemas 720 can be applied to the same IDO 630 to create multiple ADOs 730, which comprise different permutations of the IDO 630.

Application schemas 720 can determine which of the IDO's properties 631 are included in an ADO 730. Thus, the properties of the ADO 730 can comprise a subset of the properties 631 of the IDO 630. As discussed above, properties 631 can comprise elements, attributes, and methods of the IDO 630, including data corresponding to the media asset (and/or other file) to which the IDO corresponds. Embodiment 700 illustrates how a first application schema 720 can be used to translate IDO 630 into a first ADO 730-1 having properties 631-$a'$, 631-$b'$, and 631-$c'$, corresponding to a subset of the properties 631 of the IDO 630. Similarly, a second application schema 720 is used to translate IDO 630 into a second ADO 730-2. The second ADO 730-2 includes properties 631-$a''$, 631-$b$, 631-$d$, and 631-$e'$, corresponding to a second subset of the properties 631 of the IDO 630.

Some embodiments contemplate the creation of an ADO 730 using properties 631 that may not be found in a corresponding IDO 630. For instance, where a property 631 is required in an ADO 730 but not mapped or not available in a corresponding IDO 630, the property 631 can be created and given a default value, thus creating an ADO 730 having one or more properties 630 that may never have existed in the corresponding IDO 630. Default values can be completely arbitrary, and may vary depending on the name of the mapped property. For example, if an ADO 730 requires properties 631 named "CreatedBy" and "UpdatedBy," which do not correspond to any properties 631 of a corresponding IDO 630, the required properties 631 can be generated and given default values, such as "systemadmin." Of course, default values for such properties 631 can be different, depending on desired functionality.

Similar to the internal schemas 620 discussed above, application schemas 720 may alter names and/or values of data. Embodiment 700 illustrates how the names of some or all properties of ADOs 730 may differ from the names of corresponding properties of the IDO 630 from which they were derived, as noted in FIG. 7 by the "'" and "''" demarcations. For example, Property a 631-$a'$ of the first ADO 730-1 has a different name than the Property a 631-$a$ of the IDO 630. Moreover, because each application schema 720 may be different, the second application schema 720-2 can specify yet another name for a property 631. For example, Property a 631-$a''$ of the second ADO 730-2 has a different name than the Property a 631-$a$ of the IDO 630 and Property a 631-$a'$ of the first ADO 630-2. Thus, similar to the internal schemas 620, application schemas 720 can effectively map property values of application objects 730 to any property 631 of an IDO 630.

For example, an IDO 630 corresponding to a media asset may be uploaded and stored by the CHIMPS 110, the IDO 630 having a property comprising a data field with a name "Author" and a value "John Doe," indicating a name of the author of the media asset. However, a certain client application 540 of a cell phone may require a data field "Artist," rather than "Author." An entity, such as the content provider 130 and/or client application 730 provider, can specify a schema for the client application 540 of the cell phone, selecting the desired properties (such as the data field "Artist") for ADOs 730 for use with the client application 540, and mapping these properties to existing properties 631 of the IDO 630.

As with internal schemas 620, application schemas 720 can provide for the reformatting, altering, and/or combining of properties 631 of the IDO 630 to create corresponding properties 631 in ADOs 730. For example Property d 631-$d$ of IDO 630 may comprise a data filed with the a date "May 21, 2005." If, however, an ADO 730-2 needs corresponding data in a "mm/dd/yyyy" format, such a requirement may be indicated in an application schema 720-2 and implemented by the CHIMPS such that the corresponding Property d' 631-d' of ADO 730-2 has a value of "May 21, 2005." Embodiments contemplate other types manipulation of properties, which can be indicated by application schemas 720.

An external entity can specify internal, application, and/or other schemas described herein in a variety of ways. The CHIMPS 110 can, for example, provide a content provider 130 with an application such as a schema managing client by which the content provider can specify schema properties. The application can comprise a stand-alone program, a browser-based application, or more, and can be used to send schema information to the CHIMPS 110. The schema information is then utilized by one or more systems in the CHIMPS 110, such as processing servers 220, ingest servers 320, and/or storage arrays 230, to create and/or store the schemas.

Figure 8:
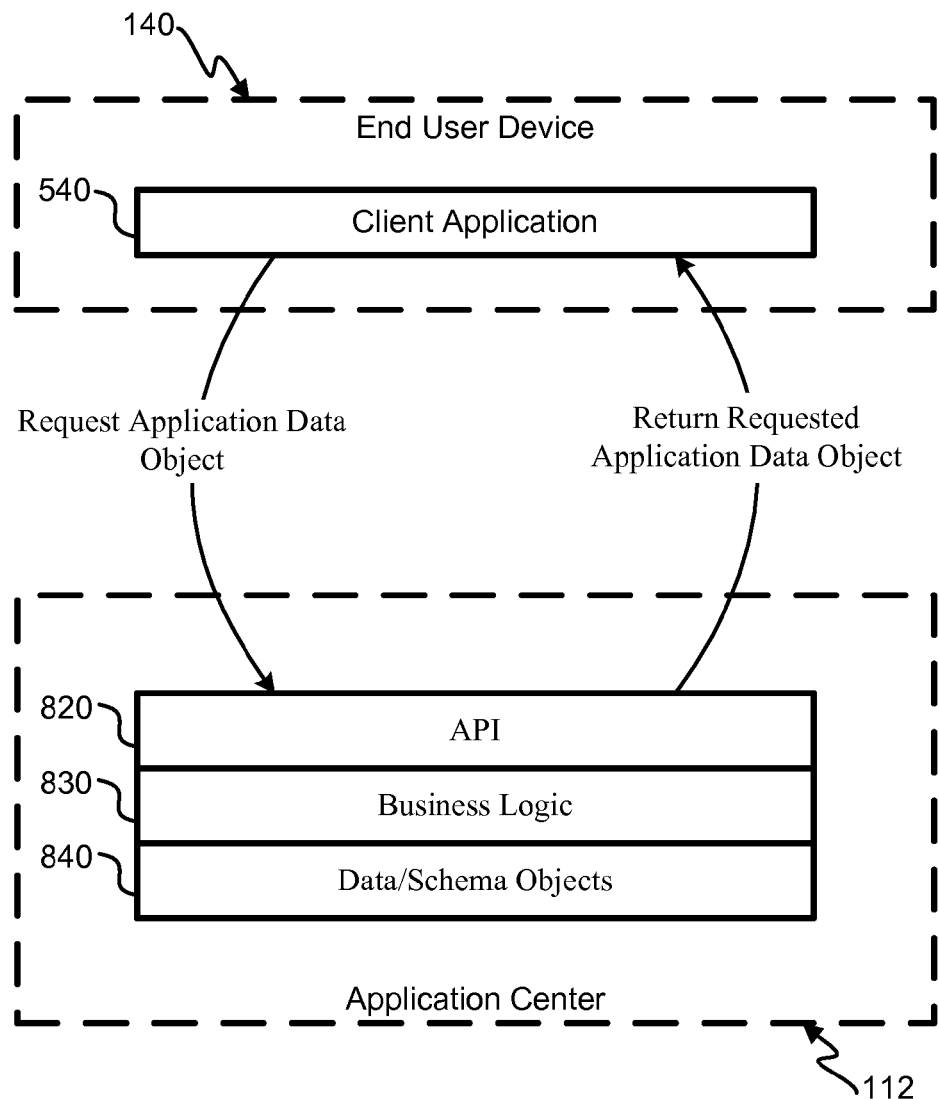
FIG. 8 is a simplified block diagram of an embodiment of systems for requesting, creating, and transmitting application data objects.

FIG. 8 is a simplified schematic diagram of an embodiment of systems for requesting, creating, and transmitting ADOs 730. An end user device 140, such as a personal computer, set-top box, tablet computer, cell phone, or other device, can execute a client application 540 that requests an ADO 730 from the CHIMPS 110. The request can be received by an API 820, which, along with business logic 830 and data/schema objects 840 can be executed and/or stored on one or more systems of an application center 112. The business logic 830 can be applied to the request to access data/schema objects 840 and determine if a corresponding IDO 630 and application schema 720 exist. If one or both is not found, the business logic 840 can be used to create an error, which can be relayed back to the client application 540 through the API 820. Otherwise, the business logic 840 can be used to generate the requested ADO 730 using the corresponding IDO 630 and application schema 720. The requested ADO 730 can then be provided to the client application 540 with the API 820.

It will be understood that embodiment 800 and other embodiments discussed herein can utilize various types of systems and objects. The API 820, for example, may be an API based on representational state transfer (REST), simple object access protocol (SOAP), or other architectures and/or protocols. The API 820 can further implement a variety of outputs formats and languages with which to return the requested ADO 730, including action message format (AMF), SOAP, Adobe Flash®, extensible markup language (XML) (including any XML-based formats), JAVASCRIPT® Object Notification (JSON), HyperText Markup Language (HTML), a custom binary format, and more.

Various systems can request and receive objects in the manner illustrated by embodiment 800. The retrieval of ADOs 730 comprising information related to files can extend beyond media, as mentioned above, to other cloud and/or web-based services. Such services can include social networking, gaming, or other services. For example, an external gaming service provider can request an ADO 730 comprising information regarding a video game (e.g., number of levels, genre, file size, etc.) utilizing a client or other application configured to communicate with the API 820. It will be understood that a wide variety of services provided by the CHIMPS 110 can utilize the retrieval of ADOs 730. By means of example and not of limitation, such services can include the redistribution of binary files (media or otherwise) with no transcoding, the repackaging of binary files for platform- or operating-system-specific file formatting (e.g., repackaging a .zip file in a WINDOWS®-based system to a .tar and/or .gz format for output to a UNIX®-based systems), or more.

Figure 9:
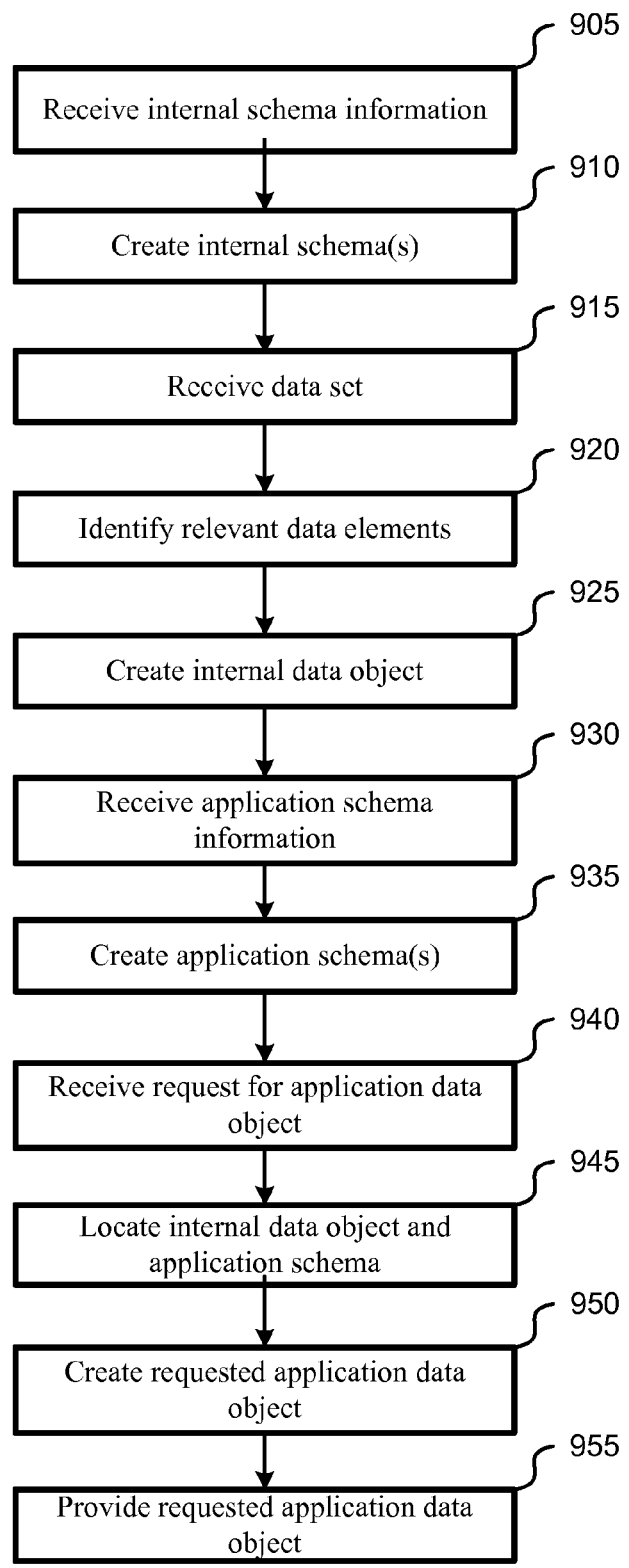
FIG. 9 is a flow diagram of an embodiment of a method for creating internal data objects and using them to generate application data objects.

FIG. 9 is a flow diagram of an embodiment of a method for creating IDOs and using them to generate ADOs, which can be performed by one or more systems of the CHIMPS 110, such as ingest server(s) 320, caching server(s) 330 and/or storage arrays 230 of an application center 112. At block 905, the method can start with receiving internal schema information. As discussed herein, the internal schema information may be provided by a content provider 130 or other external entity to facilitate the mapping of external data to IDOs 630. At block 910, this information can be used to create one or more internal schemas 620.

At block 915, a data set 610 is received. As discussed herein, the data set 610 can comprise information regarding a file (e.g., metadata), such as a media asset. The data can be provided in various ways. For example, the data may be downloaded from a server of a content provider 130. Additionally or alternatively, a content provider 130 or other external entity may upload the data to system(s) configured to create corresponding IDOs 630.

At block 920, relevant data elements are identified. This identification can be performed by using internal schema(s) 620 created at block 910. As discussed above, internal schemas 620 can be used to create IDOs 630 having certain properties 631 as required by a base schema. To do so, internal schema(s) 620 can include information to map data elements 611 of a data set 610 to properties 631 of an IDO 630. Additionally or alternatively, internal schema(s) 620 may be linked to a separate file comprising mapping information. At block 925, an IDO 630 is created.

It will be understood that the identifying relevant data elements may done without internal schemas 620. For example, a data set 610 may adhere to a standard format required for all IDOs 630. Put another way, there may be only one internal schema 620 for all IDOs 630. Alternative embodiments further provide for generating data, rather than receiving it from a content provider 130 or other external entity. For example, the CHIMPS 110 may receive and transcode a media asset, generating information regarding the media asset, thereafter creating an IDO 630 comprising information regarding the media asset using the generated information. Of course, IDOs 630 may be modified and updated by the CHIMPS 110 as the IDOs and/or files to which they correspond are processed and modified by the CHIMPS 110 and/or other systems.

At block 930, application schema information is received. As discussed above, a content provider 130, application provider, or other entity can specify the format and/or content of data objects for use by and application requiring an ADO 730. At block 935, one or more application schemas 720 are created using the received application schema information.

At block 940, a request for an ADO 730 is received, and at block 945, the corresponding IDO 630 and application schema 720 required to created the requested ADO 730 are requested. The request may be received by a system at a location different than where the IDO 630 and/or the application schema 720 resides. For example, the IDO 630 and/or application schema 720 may reside on a data object origin server 510 of a kernel application center 111, whereas the request may be received by a caching server 330 of an application center 112 geographically distant from the kernel application center 111. In cases such as this, the IDO 630 and/or application schema 720 may be persisted as described above, enabling the system receiving the request to create the requested ADO 730 locally.

At block 950, the requested ADO 730 is created, and at block 955 it is provided to the requesting entity and/or application. As discussed above, the receipt of a request for an ADO 730, as well as the providing of the requested ADO 730 may be performed by an API 820. The API 820 can be executed by one or more systems of the CHIMPS 110, such as caching server(s) 330 of an application center 112.

The ability of the CHIMPS 110 to accept data in a variety of formats to create IDOs 630, as well as provide ADOs 730 comprising any number of permutations on the IDOs, enables quick integration with the CHIMPS 110 on both ends—for both incoming and outgoing data. In fact, this ability enables the CHIMPS 110 to enable quick integration between external entities having different formats for data regarding files. For example, a content provider 130 having data in a first format regarding media assets may desire to work with a particular CDN 150 or other content distributor, requiring data in a second format, to distribute the media assets. Integration of the systems could traditionally take several months. However, each system may take only minutes to integrate with the CHIMPS 110, which can integrate the two systems by receiving data from the content provider 130 and produce it in any format the CDN 150 or other content distributor may require.

Figure 10:
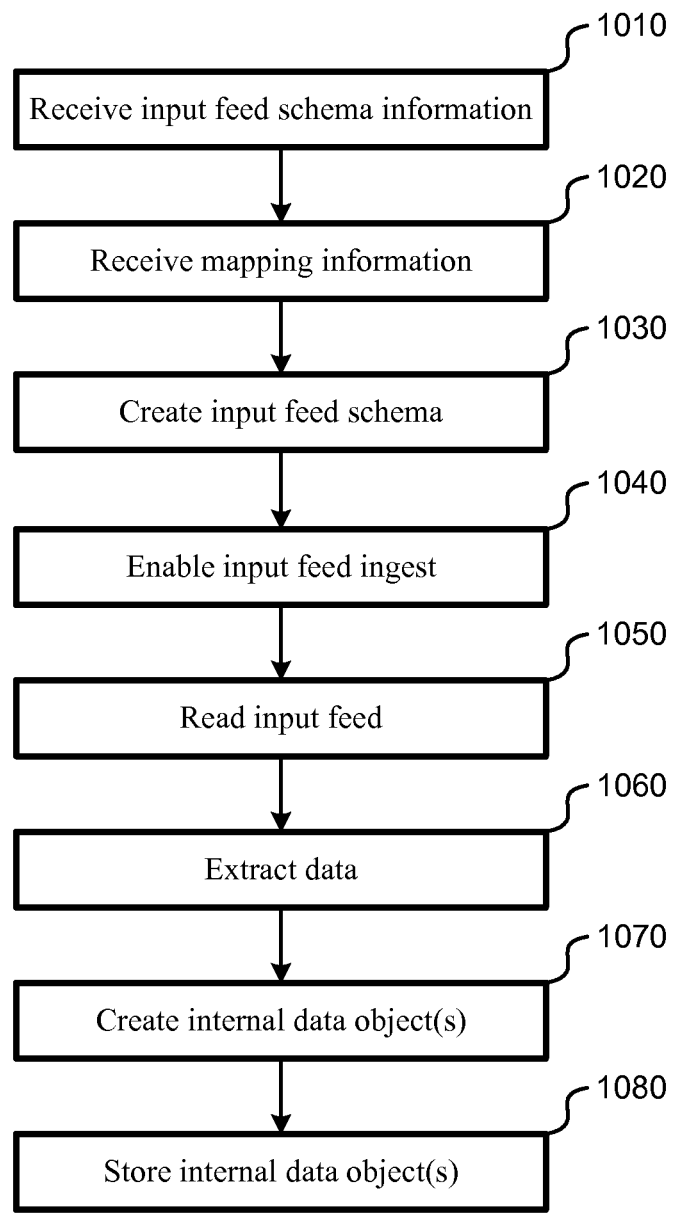
FIG. 10 is a flow diagram of an embodiment of a method for receiving data using input feeds and creating data objects with the received data.

The ability to input and output data and data objects of virtually any format allows the CHIMPS 110 to provide unique services based on this functionality. For example, the CHIMPS 110 can be configured to receive data corresponding to files, along with the files themselves, individually or in bulk, by utilizing input feeds. FIG. 10 illustrates an embodiment of a method for receiving data using input feeds and creating data objects with the received data.

The term "input feed" as used herein can comprise any file having data regarding one or more media assets (and/or other files). Examples of input feeds can include web feeds such as extensible markup language (XML), really simple syndication (RSS), media RSS (MRSS), and Atom Syndication Format. An entity providing the input feed can modify the input feed to reflect changes in the data and/or file(s) to which the data corresponds, exposing the input feed to the CHIMPS 110 for download. The CHIMPS 110, in turn, can be configured to monitor the input feed for such changes as described herein.

At block 1010, the method can begin by receiving input feed schema information, which can include a URI of the input feed. As with internal schemas 620 and application schemas 720 detailed above, a content provider 130 or other external entity can provide the CHIMPS 110 with information regarding the format and/or data elements of an input feed. It will be understood that the input feed schema may be automatically detected if the input feed comprises a format recognized by the system receiving the input feed. Moreover, at block 1020, the content provider 130 can further map data elements of the input feed to IDO properties. Similar to the schemas described above, the information for these mappings can be stored in the input feed schemas, or files linked to the input feed schemas, and the mappings may indicate modifications to data elements' names and/or values required to make such a mapping.

At block 1030, the input feed schema is created, and at block 1040 the input feed ingest is enabled. The input feed schemas, as with other schemas described herein, can be stored and persisted in the CHIMPS 110 as a data object. With the URI of the input feed and the input feed schema enabling a systems such as the CHIMPS 110 to create IDOs 630 from the input feed, one or more systems performing the method of FIG. 10 can be enabled to ingest the input feed. This can be as simple as including the URI of the input feed on a list of input feed URIs to monitor.

At block 1050, the input feed is read. Because a corresponding input feed schema has been created, the data elements of the input feed can be easily determined. At block 1060, the data is extracted from the input feed, and at blocks 1070 and 1080, the IDO(s) 630 are created and stored. As discussed above, the CHIMPS 110 can have the capacity to store the IDO(s) 630 and/or the input feed schema at any of a variety of locations within the CHIMPS, according to desired functionality. For example, the IDO can be stored at a data object origin server 510 of the CHIMPS 110, and/or persisted to one or more application centers 112.

Alternative embodiments contemplate numerous variations on the method illustrated in FIG. 10. For example, receiving feed schema information, at block 1010, may be combined with receiving mapping information, at block 1020. In addition to extracting data from an input feed, the CHIMPS may be further configured to download and/or process the file(s) to which the extracted data corresponds. For example, an input feed may provide information regarding desired formats, bitrates, or other properties for a media asset. Alternatively, the properties may be selected by a user interface of an application of the CHIMPS 110. These properties can include any measurable property of the media asset, including but not limited to video bitrate, audio bitrate, an aspect ratio (e.g., 4:3 and/or 16:9 height and width, a user-defined and/or forced aspect ratio, a pixel height and/or width, etc.), a user selected aspect ratio (e.g., force)If the CHIMPS 110 determines that one or more of the desired formats or bitrates for the media asset does not exist, the CHIMPS 110 can download and transcode the media asset to the desired format or bitrate. Moreover, the CHIMPS 110 can store the transcoded version(s) of the media asset, either internally to the CHIMPS 110 or externally (e.g. with an external CDN 150), and modify the corresponding IDO 630 to include the URI(s) of the transcoded version(s) of the media asset.

Because input feeds may be updated, the CHIMPS 110 can further be configured to automatically examine input feeds for updates. Although this examination may be performed upon triggering events, it simply may be done one a periodic basis (e.g., once every minute). Changes to the input feed can be determined various ways, such as determining a last modified date and/or time of a previously-downloaded input feed and comparing it to a last modified date and/or time of a currently-available input feed. Actual content of the input feed may also be examined and/or compared to contents of a previously-downloaded input feed. If the input feed is determined to have changed, the CHIMPS 110 may modify corresponding IDOs 630 and/or create new IDOs 630 to reflect the changes.

The ability of the CHIMPS 110 to dynamically created IDOs 630 and ADOs 730 further enables the CHIMPS 110 to provide output feeds. The output feeds can provide information regarding one or more files in any format requested by an outside entity. Similar to input feeds, the output feeds not only enable external entities to quickly integrate with the CHIMPS 110, it also enables external entities to quickly integrate with other entities integrated with the CHIMPS 110.

Figure 11:
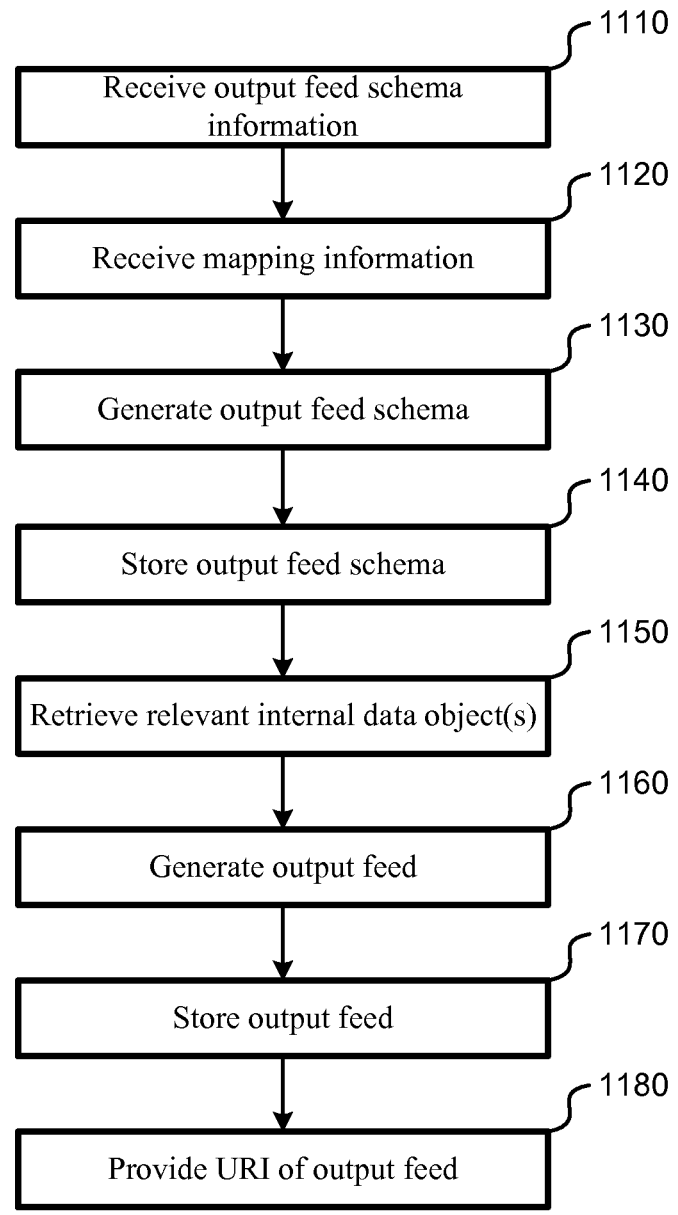
FIG. 11 is a flow diagram of an embodiment of a method for creating output feed schemas and generating output feeds based on these schemas.

FIG. 11 illustrates an embodiment of a method for creating output feed schemas and generating output feeds based on these schemas. At block 1110, output feed schema information is received, and at block 1120, mapping information is received. As with other schemas described herein, the output feed schema information can be provided by an external entity and can indicate which data elements to include in the output feed. Output feed schema information may further indicate the IDO(s) from which the corresponding output feed will be generated. The mapping information can indicate the IDO properties 631 to which the data elements correspond. Mapping information can further indicate modifications and/or changes to be made to the IDO properties 631 for generating the corresponding data elements.

At block 1130, the output feed schema is generated, based on the information provided above. At block 1140, the output feed schema is stored. As with other schemas described herein, the output feed schema can comprise an object, and the schema object may be stored and persisted throughout the CHIMPS 110 in a manner similar to that of IDOs 730.

At block 1150, the relevant IDO(s) is retrieved, and at block 1160, the output feed is generated. Similar to the input feeds described above, the output feed can comprise information regarding one or more files. Additionally, the output feed can comprise any of a variety of formats and languages, such as XML, RSS, MRSS, and Atom Syndication Format.

At block 1179, the output feed is stored, and at block 1180 a URI of the output feed is provided. The output feed can be stored anywhere in the CHIMPS 110 that can be exposed to an outside entity for monitoring. It will be understood that providing the URI of the output feed does not necessarily need to come after the output feed is stored. The CHIMPS 110 can, for example, indicate the URI of the output feed to an outside entity beforehand if the CHIMPS 110 can determine the location at which the output feed will eventually be stored.

In addition to creating the output feed, as illustrated by the method shown in FIG. 11, the CHIMPS 110 may update the output feed to reflect changes to the IDO(s) 630 to which the output feed corresponds. Additionally or alternatively, an outside entity may alter the output feed schema to indicate one or more IDOs 630 to add and/or remove from the output feed.

Figure 12:
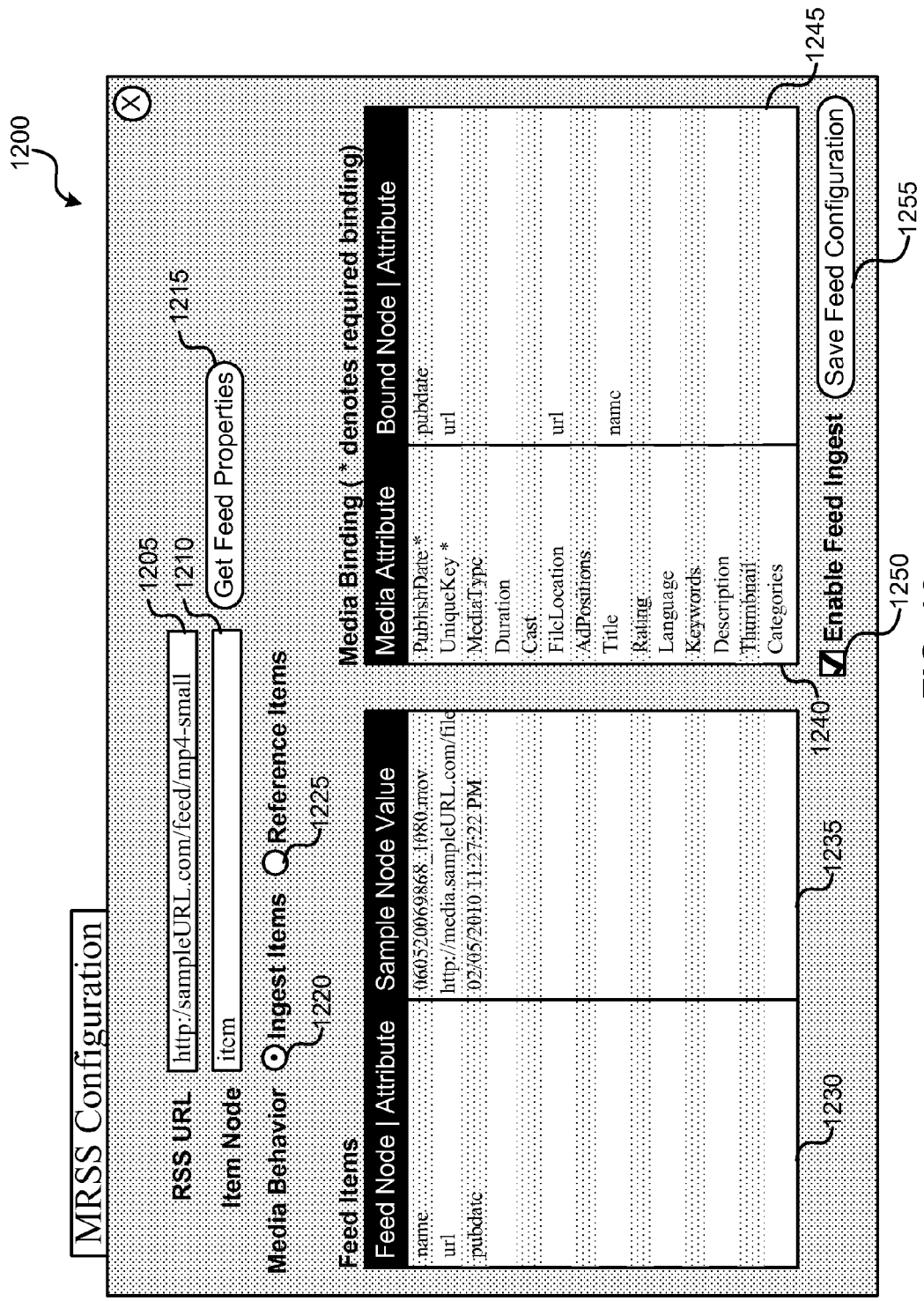
FIG. 12 is a simplified illustration of an embodiment of a user interface for enabling an external entity to create provide input feed schema and mapping information to the CHIMPS.

FIG. 12 illustrates an embodiment 1200 of a user interface for enabling an external entity to create provide input feed schema and mapping information to the CHIMPS 110. The user interface may be included in an application, such as a web-based client or stand-alone application, provided by the CHIMPS 110. In this embodiment, a the user interface includes an RSS URL field 1205 for inputting a URL of the input feed, and a Item Node field 1210 for specifying an item node of the input feed. Because embodiment 1200 accepts input feeds of a recognized format, if can therefore retrieve data elements of the input feed upon the activation of the Get Feed Properties button 1215. Once retrieved, the names and values of data elements (or "Attributes") corresponding with an example file of the input feed appear in fields 1230 and 1235 respectively. A list of available properties for a corresponding IDO 630 is shown in field 1240, and a user is able to map data elements of the input feed to properties for a corresponding IDO 630 by dragging the data elements shown in field 1230 to the areas of field 1245 corresponding with properties displayed in field 1240. A user can choose to ingest the files that the data elements of the input feed describe by selecting radio button 1220, otherwise, radio button 1225 can be selected, wherein the files simply are referenced. Checkbox 1250 allows a user to enable the input feed ingest, and the user can save the input feed schema by selecting the Save Feed Configuration button 1255.

Figure 13:
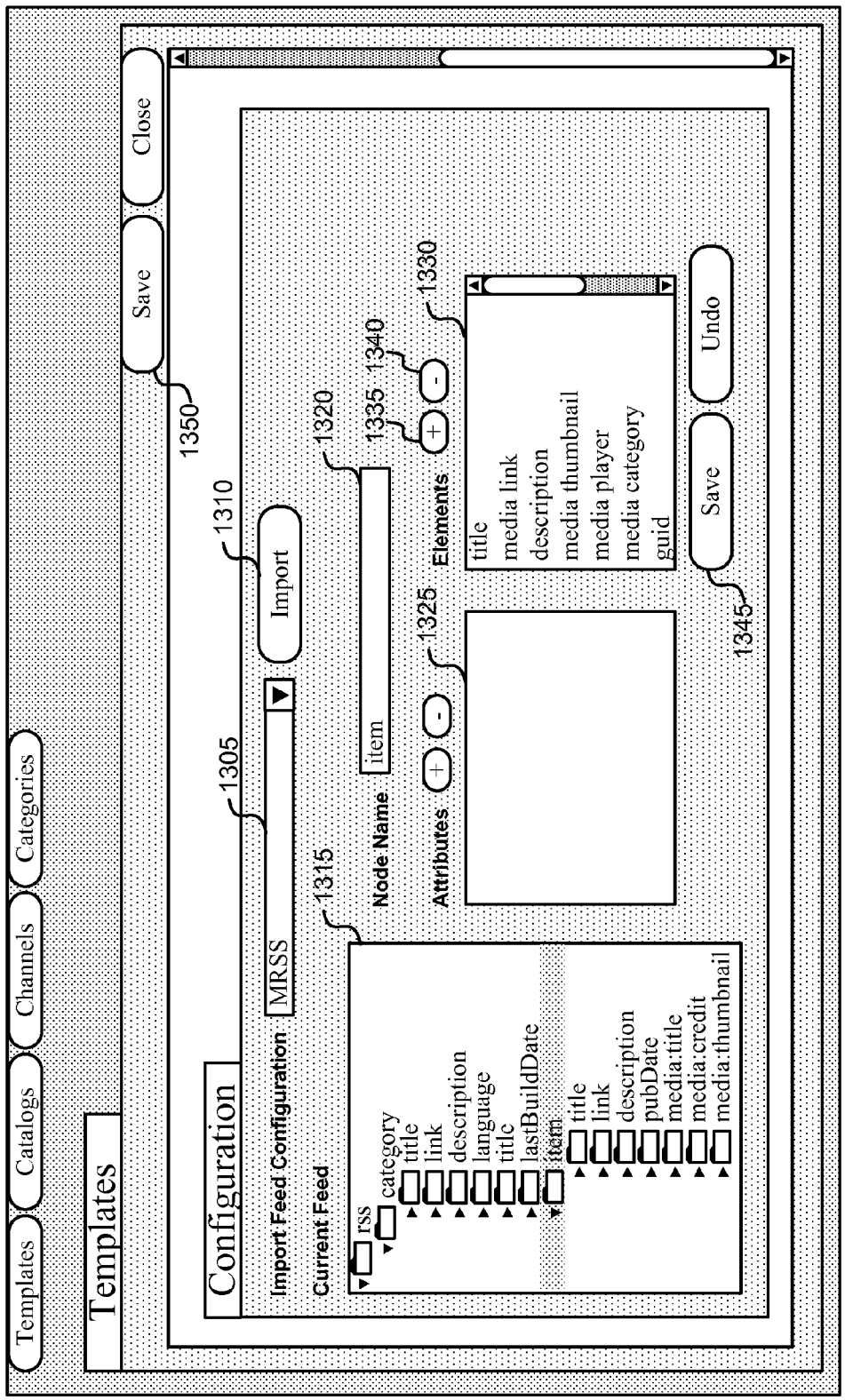
FIG. 13 is a simplified illustration of an embodiment of a user interface for enabling a user to specify a format for an output feed schema.

FIG. 13 illustrates an embodiment 1300 of a user interface for enabling a user to specify a format for an output feed schema. The user may select a general configuration to which the output feed can adhere by selecting a configuration type from the drop-down box 1305. Depending on the selected configuration type, nodes of the output feed format can appear in Current Feed field 1315. After selecting a node, a user can rename the node by typing a node name in text box 1320. Elements and attributes for the node, indicating different types of data relating to the node, will appear in Elements field 1330 and Attributes field 1325, respectively. These elements and attributes may also be modified. For example, a user may select an element listed in Elements field 1330 and type in a new name for the selected element. A user may further add and/or delete elements by selecting buttons 1335 and/or 1340, respectively. Similar functionality is provided to modify, add, and/or delete attributes. A user can then save changes made to a node by selecting button 1345. The output feed schema format may be saved by selecting button 1350.

Figure 14:
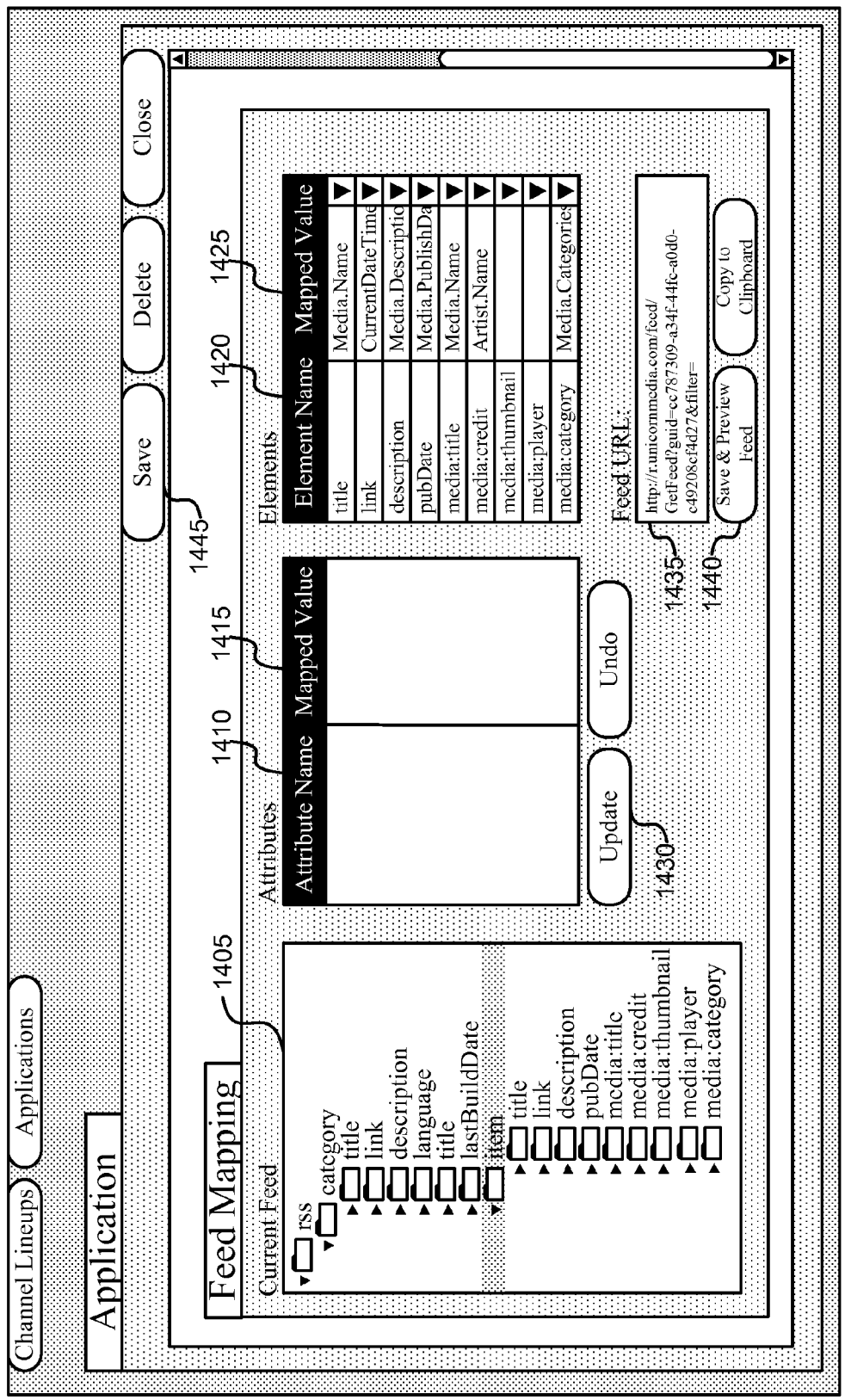
FIG. 14 is a simplified illustration of an embodiment of a user interface for enabling a user to map values of an output feed schema to properties of internal data objects.

FIG. 14 illustrates an embodiment 1400 of a user interface for enabling a user to map values of an output feed schema format and specify the IDOs 630 to include in the output feed. After selecting a one or more IDOs 630 (not shown), and an output feed schema format having the desired attributes and elements (not shown), a user can select the nodes chosen for the output feed (as shown in embodiment 1300) in Current Feed field 1405. Similar to the previous user interface 1300, attributes and elements for the selected node will appear in Attributes field 1410 and Elements field 420, respectively. Mapped values, corresponding to property types of the IDOs 630 may be selected in drop-down boxes in fields 1415 and 1425 corresponding to each attribute or element shown in Attributes field 1410 and Elements field 420, respectively. IDOs 630 for the output feed may conform to the same internal schema 620, in which the selections in drop-down boxes of fields 1415 and 1425 can apply to all IDOs 630 included in the output feed. Some embodiments contemplate functionality such that, if IDOs 630 for the output feed conform to different internal schemas 630 and have different available data to include in the output feed, the selections in drop-down boxes of fields 1415 and 1425 can apply to only those IDOs 630 with the corresponding property.

Other elements of FIG. 14 show further functionality. Update button 1430 can be used to save element and attribute mappings of a node. Feed URL field 1435 is used to display a URL of the output feed, and button 1440 can be selected to save and preview the feed output in another window. Save button 1445 can be selected to save node mappings, as well as selected output feed schema format and selected IDOs 630 (not shown).

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A server that uses data objects to generate output feeds having information associated with files, the server comprising:
    a memory;
    a processing unit which, when executing instructions embedded on the memory, causes the server to:
        receive output feed schema information;
        receive mapping information;
        generate an output feed schema based on the output feed schema information and the mapping information, wherein the output feed schema is used to determine the content of an output feed using information from one or more data objects;
        store the output feed schema;
        receive, with a network interface, at least one data object, each data object comprising a data structure having:
            information regarding a file; and
            a universal resource indicator (URI) of the file;
        use the output feed schema and the at least one data object to generate the output feed, wherein:
            the at least one data object comprises a first plurality of properties;
            the output feed comprises a second plurality of properties;
            each property of the second plurality of properties of the output feed corresponds to a property of the first plurality of properties of the at least one data object;
            the properties of the first and second pluralities of properties include a name and a value, wherein the value is associated with at least one file; and
            the output feed includes a URI of the at least one file; and
        store the output feed.

2. The server recited in claim 1, wherein the processing unit further causes the server to send, with the network interface, a URI of the output feed.

3. The server recited in claim 1, wherein the processing unit further causes the server to receive input with a user interface.

4. The server recited in claim 3, wherein the user interface is configured to receive a selection of properties comprising the second plurality of properties of the output feed.

5. The server recited in claim 1, wherein a property of the second plurality of properties has a different name than the property of the first plurality of properties to which it corresponds.

6. The server recited in claim 1, wherein the processing unit further causes the server to:
    determine the at least one data object has changed; and
    update the output feed to reflect a change in the at least one data object.

7. A method for providing output feeds having information associated with at least one file, the method comprising:
    receiving output feed schema information;
    receiving mapping information;
    generating an output feed schema based on the output feed schema information and the mapping information, wherein:
        the output feed schema is used to determine the content of an output feed using information from at least one data object;
        each data object comprises a data structure having:
            information regarding a file; and
            a universal resource indicator (URI) of the file; and
    storing the output feed schema;
    using the output feed schema and the at least one data object to generate the output feed, wherein:
        the at least one data object comprises a first plurality of properties;
        the output feed comprises a second plurality of properties;
        each property of the second plurality of properties of the output feed corresponds to a property of the first plurality of properties of the at least one data object;
        the properties of the first and second pluralities of properties include a name and a value, wherein the value is associated with at least one file; and
        the output feed includes a URI of the at least one file;
        storing the output feed; and
    providing a URI of the output feed.

8. The method recited in claim 7, further comprising receiving input with a user interface.

9. The method recited in claim 8, wherein the user interface is configured to receive a selection of properties comprising the second plurality of properties of the output feed.

10. The method recited in claim 8, wherein the user interface is configured to receive information for corresponding a property of the second plurality of properties to a property of the first plurality of properties.

11. The method recited in claim 8, wherein the at least one file comprises at least one media asset and the user interface is configured to receive one or more properties for transcoding the at least one media asset.

12. The method recited in claim 11, wherein the one or more properties include information regarding:
    an audio bitrate,
    a video bitrate, or
    an aspect ratio.

13. The method recited in claim 11, further comprising using the one or more properties to transcode the at least one media asset.

14. The method recited in claim 7, wherein a property of the second plurality of properties has a different name than the property of the first plurality of properties to which it corresponds.

15. The method recited in claim 7, wherein the output feed comprises one or more of:
    extensible markup language (XML);
    really simple syndication (RSS);
    media RSS (MRSS); and
    Atom Syndication Format.

16. The method recited in claim 7, further comprising:
    determining the at least one data object has changed; and
    updating the output feed to reflect a change in the at least one data object.

17. One or more non-transitory machine-readable media having a set of instructions stored thereon for providing information regarding media assets using output feeds, the instructions causing one or more machines to:
    receive output feed schema information;
    receive mapping information;
    generate an output feed schema based on the output feed schema information and the mapping information, wherein the output feed schema is used to determine the content of an output feed using information regarding one or more media assets;
    store the output feed schema;
    receive information regarding at least one media asset, including a universal resource indicator (URI) of the at least one media asset;
    use the output feed schema and the information regarding at least one media asset to generate the output feed, wherein:
        the information regarding at least one media asset comprises a first plurality of properties;
        the output feed comprises a second plurality of properties;
        each property of the second plurality of properties of the output feed corresponds to a property of the first plurality of properties of the information regarding at least one media asset;
        the properties of the first and second pluralities of properties include a name and a value, wherein the value is associated with the at least one media asset; and
        the output feed includes a URI of the at least one media asset; and
    store the output feed.

18. The one or more non-transitory machine-readable media recited in claim 17, wherein the instructions further cause the one or more machines to receive input with a user interface.

19. The one or more non-transitory machine-readable media recited in claim 18, wherein the user interface is configured to receive information for corresponding a property of the second plurality of properties to a property of the first plurality of properties.

20. The one or more non-transitory machine-readable media recited in claim 18, wherein the user interface is further configured to receive input regarding one or more properties for transcoding the at least one media asset.

21. The one or more non-transitory machine-readable media recited in claim 20, wherein the one or more of the following properties include:
    a video bitrate;
    an audio bitrate; or
    an aspect ratio.

22. The one or more non-transitory machine-readable media recited in claim 20, wherein the instructions further cause the one or more machines to transcode the at least one media asset using the input.

* * * * *